(12) United States Patent
Yurt et al.

(10) Patent No.: US 9,309,443 B2
(45) Date of Patent: Apr. 12, 2016

(54) LIQUID OPTICAL ADHESIVE COMPOSITIONS

(71) Applicant: 3M INNOVATIVE PROPERTIES COMPANY, St. Paul, MN (US)

(72) Inventors: Serkan Yurt, Woodbury, MN (US); Jason D. Clapper, Lino Lakes, MN (US); Ross E. Behling, Woodbury, MN (US); Christopher J. Campbell, Burnsville, MN (US); Mark F. Ellis, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/404,063

(22) PCT Filed: May 22, 2013

(86) PCT No.: PCT/US2013/042140
§ 371 (c)(1),
(2) Date: Nov. 26, 2014

(87) PCT Pub. No.: WO2013/181030
PCT Pub. Date: Dec. 5, 2013

(65) Prior Publication Data
US 2015/0184031 A1    Jul. 2, 2015

Related U.S. Application Data

(60) Provisional application No. 61/652,386, filed on May 29, 2012.

(51) Int. Cl.
| | | |
|---|---|---|
| C09J 4/00 | (2006.01) |
| C09J 4/06 | (2006.01) |
| B05D 1/02 | (2006.01) |
| B05D 1/28 | (2006.01) |
| B05D 1/30 | (2006.01) |
| B05D 3/06 | (2006.01) |
| B05D 3/12 | (2006.01) |
| B05D 5/00 | (2006.01) |
| B32B 7/12 | (2006.01) |
| G02B 1/04 | (2006.01) |
| C08F 220/18 | (2006.01) |

(52) U.S. Cl.
CPC ... *C09J 4/00* (2013.01); *B05D 1/02* (2013.01); *B05D 1/28* (2013.01); *B05D 1/305* (2013.01); *B05D 3/06* (2013.01); *B05D 3/12* (2013.01); *B05D 5/00* (2013.01); *B32B 7/12* (2013.01); *C09J 4/06* (2013.01); *G02B 1/04* (2013.01); *B32B 2250/03* (2013.01); *B32B 2255/26* (2013.01); *B32B 2307/412* (2013.01); *B32B 2457/20* (2013.01); *C08F 2220/1883* (2013.01); *Y10T 428/269* (2015.01); *Y10T 428/31507* (2015.04); *Y10T 428/31612* (2015.04); *Y10T 428/31663* (2015.04)

(58) Field of Classification Search
None
See application file for complete search history.

(56) References Cited

U.S. PATENT DOCUMENTS

| | | | |
|---|---|---|---|
| 6,448,301 B1 | 9/2002 | Gaddam | |
| 6,664,306 B2 | 12/2003 | Gaddam | |
| 7,005,143 B2 | 2/2006 | Abuelyaman | |
| 7,595,352 B2 * | 9/2009 | Choi | C08G 18/8175 156/275.5 |
| 7,691,437 B2 | 4/2010 | Ellis | |
| 7,767,728 B2 | 8/2010 | Lu | |
| 8,137,807 B2 * | 3/2012 | Clapper et al. | 428/355 AC |
| 2002/0137857 A1 * | 9/2002 | Lange | C08F 2/02 526/64 |
| 2004/0127594 A1 * | 7/2004 | Yang et al. | 522/114 |
| 2007/0191506 A1 * | 8/2007 | Lu | C08F 2/48 522/178 |
| 2009/0233048 A1 * | 9/2009 | Murata et al. | 428/143 |
| 2009/0283211 A1 | 11/2009 | Matsuhira | |
| 2010/0029059 A1 | 2/2010 | Matsumura | |
| 2010/0086705 A1 | 4/2010 | Everaerts | |
| 2010/0086706 A1 | 4/2010 | Everaerts | |
| 2010/0118245 A1 | 5/2010 | Toyoda | |
| 2010/0265444 A1 | 10/2010 | Nguyen | |
| 2011/0021655 A1 | 1/2011 | Smothers | |
| 2011/0033720 A1 | 2/2011 | Fujita | |
| 2011/0201717 A1 | 8/2011 | Held | |
| 2012/0115976 A1 * | 5/2012 | Igarashi et al. | 522/120 |
| 2012/0225997 A1 * | 9/2012 | Niwa et al. | 524/850 |

FOREIGN PATENT DOCUMENTS

| | | |
|---|---|---|
| JP | 2008-195753 | 8/2008 |
| WO | WO 00-09619 | 2/2000 |
| WO | WO 2010-027041 | 3/2010 |
| WO | WO 2011-084405 | 7/2011 |
| WO | WO 2011-119828 | 9/2011 |
| WO | WO 2012-024217 | 2/2012 |

OTHER PUBLICATIONS

International Search report for the PCT International Application No. PCT/US2013/042140, mailed on Jul. 23, 2013, 3 pages.

* cited by examiner

*Primary Examiner* — Satya Sastri
(74) *Attorney, Agent, or Firm* — Kent S. Kokko

(57) ABSTRACT

The disclosure describes a curable composition comprising a) a solute (meth)acryloyl oligomer having a plurality of pendent, ethylenically unsaturated, free-radically polymerizable functional groups and nucleophilic, hydrophilic groups, a) $M_w$ of 5 k to 30 k, a $T_g<20°$ C.; b) a solvent monomer component; and a photoinitiator. The curable composition may be used as an adhesive in optical applications.

30 Claims, No Drawings

LIQUID OPTICAL ADHESIVE COMPOSITIONS

CROSS REFERENCE TO RELATED APPLICATIONS

This application is a national stage filing under 35 U.S.C. 371 of PCT/US2013/042140, filed May 22, 2013, which claims priority to Provisional Application No. 61/652,386, filed May 29, 2012, the disclosure of which is incorporated by reference in its/their entirety herein.

FIELD

The present disclosure relates to optically clear adhesives and laminates that include the adhesives.

BACKGROUND

Optically clear adhesives are finding wide applications in optical displays. Such applications include bonding polarizers to modules of a liquid crystal display (LCD) and attaching various optical films to a glass lens in, for example, mobile hand held (MHH) devices. During use, the display can be subjected to various environmental conditions, such as high temperature and/or high humidity.

It has been observed that adhesives can exhibit a cloud point after subjecting optical laminates of optical films and adhesives to high temperature/humidity accelerated aging tests and subsequently cooling the laminates down to ambient conditions. While still hot, the laminates may be perfectly clear, even when saturated with moisture. But upon cooling they can exhibit a cloud point and turn hazy or "white". Frequently, the haze will disappear over time upon storage of the laminate under ambient conditions. The haze disappearance can often be accelerated by gently heating the optical laminates.

SUMMARY

The present disclosure includes a curable composition comprising a) a solute (meth)acryloyl oligomer having a plurality of pendent, ethylenically unsaturated, free-radically polymerizable functional groups and pendent hydroxyl groups, a $M_w$ of 5 k to 30 k, a $T_g < 20°$ C. (preferably having a $T_g < 0°$ C.); b) a solvent monomer component; and a photoinitiator.

The composition, when cured, is non-yellowing, exhibits low shrinkage, low birefringence and low sensitivity to moisture (cloud point-resistant), making it suitable for many optical applications including, but not limited to bonding polarizers to modules of a liquid crystal display (LCD) and attaching various optical films to a glass lens in, for example, mobile hand held (MHH) devices. The composition is low viscosity so that it may be used as a dispensable optical adhesive, and builds molecular weight by a chain-growth addition process.

In one aspect, an optically clear laminate is provided that includes a first substrate having at least one major surface, a second substrate having at least one major surface, and the cured optical adhesive composition disposed between the two substrates. The articles of the disclosure may have a thickness greater than about 0.5 millimeters, generally a birefringence (absolute) of less than $1 \times 10^{-6}$, light transmission greater than about 85%, preferably greater than 90%, and a CIELAB b* less than about 1.5 units, preferably less than about 1.0 unit for samples with thickness of 500 microns.

In a further aspect, an optically clear laminate is provided that includes a first substrate having at least one major surface, a second substrate having at least one major surface, and a cloud point-resistant, optically clear adhesive composition situated between and in contact with at least one major surface of the first substrate and at least one major surface of the second substrate, wherein the adhesive has a moisture-vapor transmission rate of at least 400 $g/m^2/day$.

By incorporating hydrophilic moieties in the liquid optical adhesive matrix, haze-free, cloud point-resistant adhesives can be obtained which remain clear even after high temperature/humidity accelerated aging tests. The provided adhesives are suitable for use in, for example, laminating polarizers to optical LCDs, attaching various optical films to glass lenses in mobile handheld devices, and other adhesive application that require optical clarity in various temperature and humidity environments.

Although not wishing to be bound by theory, it is thought that the haze appears when the adhesive becomes saturated with water at elevated temperatures, and the concentration of water exceeds the cloud point when quickly cooled due to poor compatibility of the moisture with the adhesive matrix. This can result in phase separation of small water droplets, which due to a mismatch in refractive index with the adhesive matrix causes haze or a "white" appearance. If the droplets remain very small (e.g., a few hundred nanometers or less) or the water remains fully solubilized in the adhesive under ambient conditions, the adhesive and its bond line with the substrate will stay clear while it re-equilibrates its moisture content with the environment. To facilitate re-equilibration of the moisture with its environment, it is also anticipated that the moisture-vapor transmission rate of the adhesive needs to be high enough to transport the water at a sufficiently high rate to prevent water accumulation which may lead to light scattering and haze.

As used herein:

"cloud point" refers to the temperature at which a mixture of adhesive and water separate into a continuous adhesive phase and a dispersed water phase, where the dispersed phase is larger than the wavelength of light and thus make the adhesive appear "white" or cloudy;

"Alkyl" means a linear or branched, cyclic or acyclic, saturated monovalent hydrocarbon having from one to about 32, e.g., methyl, ethyl, 1-propyl, 2-propyl, pentyl, and the like.

"Alkylene" means a linear saturated divalent hydrocarbon having from one to about twelve carbon atoms or a branched saturated divalent hydrocarbon radical having from three to about twelve carbon atoms, e.g., methylene, ethylene, propylene, 2-methylpropylene, pentylene, hexylene, and the like.

"Heteroalkyl" includes both straight-chained, branched, and cyclic alkyl groups with one or more heteroatoms independently selected from S, P, Si, O, and N with both unsubstituted and substituted alkyl groups. Unless otherwise indicated, the heteroalkyl groups typically contain from 1 to 20 carbon atoms. "Heteroalkyl" is a subset of "hydrocarbyl containing one or more S, N, O, P, or Si atoms" described below. Examples of "heteroalkyl" as used herein include, but are not limited to, methoxy, ethoxy, propoxy, 3,6-dioxaheptyl, 3-(trimethylsilyl)-propyl, 4-dimethylaminobutyl, and the like. Unless otherwise noted, heteroalkyl groups may be mono- or polyvalent, i.e. monovalent heteroalkyl or polyvalent heteroalkylene.

"Aryl" is an aromatic group containing 6-18 ring atoms and can contain optional fused rings, which may be saturated, unsaturated, or aromatic. Examples of an aryl groups include phenyl, naphthyl, biphenyl, phenanthryl, and anthracyl. Heteroaryl is an aryl containing 1-3 heteroatoms such as nitrogen, oxygen, or sulfur and can contain fused rings. Some examples of heteroaryl groups are pyridyl, furanyl, pyrrolyl, thienyl, thiazolyl, oxazolyl, imidazolyl, indolyl, benzofuranyl, and benzthiazolyl. Unless otherwise noted, aryl and heteroaryl groups may be mono- or polyvalent, i.e. monovalent aryl or polyvalent arylene.

"(Hetero)hydrocarbyl" is inclusive of hydrocarbyl alkyl and aryl groups, and heterohydrocarbyl heteroalkyl and heteroaryl groups, the later comprising one or more catenary oxygen heteroatoms such as ether or amino groups. Heterohydrocarbyl may optionally contain one or more catenary (in-chain) functional groups including ester, amide, urea, urethane, and carbonate functional groups. Unless otherwise indicated, the non-polymeric (hetero)hydrocarbyl groups typically contain from 1 to 60 carbon atoms. Some examples of such heterohydrocarbyls as used herein include, but are not limited to, methoxy, ethoxy, propoxy, 4-diphenylaminobutyl, 2-(2'-phenoxyethoxy)ethyl, 3,6-dioxaheptyl, 3,6-dioxahexyl-6-phenyl, in addition to those described for "alkyl", "heteroalkyl", "aryl", and "heteroaryl" supra.

"acryloyl" is inclusive of both esters and amides.

"(meth)acryloyl" includes both acryloyl and methacryloyl groups; i.e. is inclusive of both esters and amides.

DETAILED DESCRIPTION

Oligomer

As a first component, the adhesive composition has a solute (meth)acryolyl oligomer having a $M_w$ of 5 to 30 k, preferably 8 to 15 k, and a $T_g$ of <20° C., preferably <10° C., more preferably <0° C., a solvent diluents monomer component and a photoinitiator. In some embodiments the composition comprises:

greater than 50 parts by weight, preferably greater than 80 parts and most preferably greater than 90 parts of an oligomer having a plurality of pendent free-radically polymerizable functional groups and having a $M_w$ of 5 to 30K and a $T_g$ of <20° C.;

less than 50 parts by weight, preferably less than 20 parts, and most preferably less than 10 parts of a diluent solvent monomer component;

and 0.001 to 5 parts by weight, preferably 0.001 to 1, most preferably 0.01 to 0.1 parts of a photoinitiator, based on 100 parts by weight of the oligomer and diluent solvent monomer.

The oligomer generally comprises polymerized monomer units of:
a) greater than 50 parts by weight, preferably greater than 75 parts by weight, most preferably greater than 80 parts by weight of (meth)acrylate ester monomer units;
b) 10 to 49 parts by weight, preferably 10 to 35 parts by weight, most preferably 15 to 25 parts by weight, of monomer units having a pendent hydroxy functional group,
c) 1 to 10 parts by weight, preferably 1 to 5 parts by weight, most preferably 1 to 3 parts by weight, of monomer units having a pendent, free-radically polymerizable functional groups,
d) 0 to 20 parts by weight of other polar monomer units, wherein the sum of the monomer units is 100 parts by weight.

In one aspect, the oligomer comprises (meth)acrylate ester monomer units, (meth)acrylate ester can include aliphatic, cycloaliphatic, or aromatic alkyl groups. Useful alkyl acrylates (i.e., acrylic acid alkyl ester monomers) include linear or branched monofunctional acrylates or methacrylates of nontertiary alkyl alcohols.

Useful monomers include, for example, 2-ethylhexyl (meth)acrylate, ethyl(meth)acrylate, methyl(meth)acrylate, n-propyl(meth)acrylate, isopropyl(meth)acrylate, pentyl (meth)acrylate, n-octyl(meth)acrylate, isooctyl(meth)acrylate, isononyl(meth)acrylate, n-butyl(meth)acrylate, isobutyl (meth)acrylate, hexyl(meth)acrylate, n-nonyl(meth)acrylate, isoamyl(meth)acrylate, n-decyl(meth)acrylate, isodecyl (meth)acrylate, lauryl(meth)acrylate, dodecyl(meth)acrylate, cyclohexyl(meth)acrylate, phenyl meth(acrylate), benzyl meth(acrylate), tridecyl(meth)acrylate, 2-propylheptyl (meth)acrylate and 2-methylbutyl(meth)acrylate, and combinations thereof. In some embodiments, the average carbon number of the alkanol portion of the (meth)acrylates is 10 to 14.

The oligomer has a $T_g$ of <20° C., preferably <10° C., more preferably <0° C. A useful predictor of interpolymer $T_g$ for specific combinations of various monomers can be computed by application of Fox Equation: $1/T_g = \Sigma W_i/T_g i$. In this equation, $T_g$ is the glass transition temperature of the mixture, Wi is the weight fraction of component i in the mixture, and $T_g i$ is the glass transition temperature of component i, and all glass transition temperatures are in Kelvin (K). In order that the oligomer have a $T_g$<20° C., it is expedient to include low $T_g$ monomers.

As used herein the term "low $T_g$ monomer" refers to a monomer, which when homopolymerized, produce a (meth) acryloyl copolymer having a $T_g$ of <20° C. The incorporation of the low $T_g$ monomer to the oligomer is sufficient to reduce the glass transition temperature of the resulting copolymer to <20° C., as calculated using the Fox Equation. Alternatively, the glass transition temperature can be measured in a variety of known ways, including, e.g., through differential scanning calorimetry (DSC).

Suitable low $T_g$ monomers have one ethylenically unsaturated group and a glass transition temperature of less than 20° C., preferably less than 10° C., (as estimated by the Fox Equation), which are suitable in the present disclosure include, for example, n-butyl acrylate, isobutyl acrylate, hexyl acrylate, 2-ethyl-hexylacrylate, isooctylacrylate, caprolactoneacrylate, isodecylacrylate, tridecylacrylate, laurylmethacrylate, methoxy-polyethylenglycol-monomethacrylate, laurylacrylate, tetrahydrofurfuryl-acrylate, ethoxy-ethoxyethyl acrylate and ethoxylated-nonylacrylate. Especially preferred are 2-ethyl-hexylacrylate, ethoxy-ethoxyethyl acrylate, tridecylacrylate and ethoxylated nonylacrylate.

In some embodiments the (meth)acrylic acid ester monomer component may comprise (meth)acrylate esters of 2-alkyl alkanols wherein the molar carbon number average of said 2-alkyl alkanols is 12 to 32. The Guerbet alkanol-derived (meth)acrylic monomers have the ability to form (co)polymers with unique and improved properties over comparable, commonly used adhesive acrylate (co)polymers. These properties include a very low $T_g$, a low solubility parameter for acrylic polymers, and a low storage modulus creating a very conformable elastomer. When Guerbet monomers are included, the (meth)acrylate ester component may include up to 100 parts by weight, preferably up to 50 parts by weight of the (meth)acrylate ester monomer component. Such Guerbet (meth)acrylate esters are described in Applicant's U.S. Pat. No. 8,137,807 (Lewandowski et al.) and is incorporated herein by reference.

In some preferred embodiments, the (meth)acrylate ester is derived from alkanols having an average carbon number of $C_8$-$C_{32}$, preferably $C_{10}$-$C_{14}$. This average carbon number may be calculated based on the weight percentages of each (meth)acrylate ester monomer.

The oligomer further comprises a hydrophilic, hydroxyl functional monomer. The hydrophilic, hydroxyl functional monomeric compound typically has a hydroxyl equivalent weight of less than 400. The hydroxyl equivalent molecular weight is defined as the molecular weight of the monomeric compound divided by the number of hydroxyl groups in the monomeric compound The hydroxyl functional monomer has the general formula:

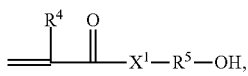

wherein
$R^5$ is a hydrocarbyl group, including alkylene, arylene and combinations thereof, more preferably a $C_1$-$C_6$ alkylene;
$R^4$ is —H or $C_1$-$C_4$ alkyl; and
$X^1$ is —$NR^4$— or —O—.

Useful monomers of this type include hydroxyethyl(meth)acrylate, hydroxypropyl(meth)acrylate, 2-hydroxy-2-phenoxypropyl(meth)acrylate, and hydroxybutyl(meth)acrylate, 2-hydroxyethylacrylamide, and N-hydroxypropylacrylamide.

The hydroxyl functional monomer is generally used in amounts of 10 to 49 parts by weight based upon 100 parts total monomers of the oligomer.

The oligomer optionally further comprises a hydrophilic polar monomer, other than the hydroxyl-functional monomer. The hydrophilic monomer typically has a average molecular weight ($M_n$) of greater than about 70, or greater than about 500, or even higher. Suitable hydrophilic polymeric compounds include poly(ethylene oxide) segments, hydroxyl functionality, or a combination thereof. The combination of poly(ethylene oxide) and hydroxyl functionality in the polymer needs to be high enough to make the resulting polymer hydrophilic. By "hydrophilic" it is meant that the polymeric compound can incorporate at least 25 weight percent of water without phase separation.

Typically, suitable hydrophilic polymeric compounds may contain poly(ethylene oxide) segments that include at least 10, at least 20, or even at least 30 ethylene oxide units. Alternatively, suitable hydrophilic polymeric compounds include at least 25 weight percent of oxygen in the form of ethylene glycol groups from poly(ethylene oxide) or hydroxyl functionality based upon the hydrocarbon content of the polymer.

Useful hydrophilic polymer compounds may be copolymerizable or non-copolymerizable with the adhesive composition, as long as they remain miscible with the adhesive and yield an optically clear adhesive composition. Copolymerizable, hydrophilic polymer compounds include, for example, CD552, available from Sartomer Company, Exton, Pa., which is a monofunctional methoxylated polyethylene glycol (550) methacrylate, or SR9036, also available from Sartomer, that is an ethoxylated bisphenol A dimethacrylate that has 30 polymerized ethylene oxide groups between the bisphenol A moiety and each methacrylate group. Other examples include phenoxypolyethylene glycol acrylate available from Jarchem Industries Inc., Newark, N.J.

The polar monomer component may also include weakly polar monomers such as acrylic monomer containing carboxylic acid, amide, urethane, or urea functional groups. In general, the polar monomer content in the adhesive can include less than about 5 parts by weight or even less than about 3 parts by weight of one or more polar monomers. Useful carboxylic acids include acrylic acid and methacrylic acid. Useful amides include N-vinyl caprolactam, N-vinyl pyrrolidone, (meth)acrylamide, N-methyl(meth)acrylamide, N,N-dimethyl acrylamide, N,N-dimethyl meth(acrylamide), and N-octyl(meth)acrylamide.

The hydroxyl functional monomer and polar monomers are used in amounts such that the oligomer is hydrophilic. By "hydrophilic" it is meant that the oligomeric compound can incorporate at least 25 weight percent of water without phase separation. Generally the polar monomer are used in amounts of 0 to 20 parts, based on 100 parts total monomer of the oligomer. Generally the polar monomer, when present is used in amounts of 1 to 10 parts, preferably 1 to 5 parts.

The oligomer optionally contains silane monomers [$M^{Silane}$] including those with the following formula:

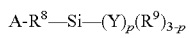

wherein:
A is an ethylenically unsaturated polymerizable group, including vinyl, allyl, vinyloxy, allyloxy, and (meth)acryloyl, preferably (meth)acrylate;
$R^8$ is a covalent bond or a divalent (hetero)hydrocarbyl group.

In one embodiment $R^8$ is a divalent hydrocarbon bridging group of about 1 to 20 carbon atoms, including alkylene and arylene and combinations thereof, optionally including in the backbone 1 to 5 moieties selected from the group consisting of —O—, —C(O)—, —S—, —$SO_2$— and —$NR^1$— groups (and combinations thereof such as —C(O)—O—), wherein $R^1$ is hydrogen, or a $C_1$-$C_4$ alkyl group. In another embodiment, $R^8$ is a poly(alkylene oxide) moiety of the formula —($OCH_2CH_2$—)$_f$$OCH_2CH(R^1)$)$_g$, wherein f is at least 5, g may be 0, and preferably at least 1, and the mole ratio of f:g is at least 2:1 (preferably at least 3:1), and $R^1$ is H or a $C_1$-$C_4$ alkyl.

Preferably, $R^8$ is a divalent alkylene, Y is a hydrolysable group, including alkoxy, acyloxy and halo; $R^9$ is a monovalent alkyl or aryl group, p is 1, 2 or 3, preferably 3.

Useful silane monomers include, for example, 3-(methacryloyloxy)propyltrimethoxysilane, 3-acryloxypropyltrimethoxysilane, 3-acryloyloxypropyltriethoxysilane, 3-(methacryloyloxy)propyltriethoxysilane, 3-(methacryloyloxy)propylmethyldimethoxysilane, 3-(acryloyloxypropyl)methyldimethoxysilane, 3-(methacryloyloxy)propyldimethylethoxysilane, 3-(methacryloyloxy)propyldiethylethoxysilane, vinyldimethylethoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, and mixtures thereof.

The optional silane monomers [$M^{Si}$] are used in amounts of 0 to 10, preferably 1-5, parts by weight, relative to 100 parts by weight total monomer. Such optional silane monomers are used as adhesion promoters for improved bonding to metal, to silaceous surfaces, to surfaces having —OH groups, or as a self-crosslinking group for the curable composition.

The oligomer further comprises polymerized monomer units having a pendent ethylenically unsaturated polymerizable group. The ethylenically unsaturated group is provided to the oligomer by an indirect route whereby a portion of the pendent hydroxyl groups of the oligomer are further functionalized by reaction with a co-reactive, electrophilic compound having an ethylenically unsaturated group—"co-reactive monomers".

The co-reactive functional group preferably comprises a carboxyl, isocyanato, epoxy, anhydride, or oxazolinyl group, oxazolinyl compounds such as 2-ethenyl-1,3-oxazolin-5-one and 2-propenyl-4,4-dimethyl-1,3-oxazolin-5-one; carboxy-substituted compounds such as (meth)acrylic acid and 4-carboxybenzyl(meth)acrylate; isocyanato-substituted compounds such as isocyanatoethyl(meth)acrylate and 4-isocyanatocyclohexyl(meth)acrylate; epoxy-substituted compounds such as glycidyl(meth)acrylate; aziridinyl-substituted compounds such as N-acryloylaziridine and 1-(2-propenyl)-aziridine; and acryloyl halides such as (meth)acryloyl chloride.

Preferred co-reactive monomers have the general formula

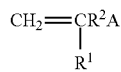

wherein $R^1$ is hydrogen, a $C_1$ to $C_4$ alkyl group, or a phenyl group, preferably hydrogen or a methyl group; $R^2$ is a single bond or a (hetero)hydrocarbyl divalent linking group that joins an ethylenically unsaturated group to co-reactive functional group A and preferably contains up to 34, preferably up to 18, more preferably up to 10, carbon and, optionally, oxygen and nitrogen atoms and, when $R^2$ is not a single bond, is preferably selected from

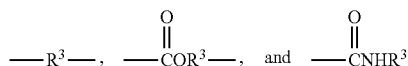

wherein $R^3$ is an alkylene group having 1 to 6 carbon atoms, a 5- or 6-membered cycloalkylene group having 5 to 10 carbon atoms, or an alkylene-oxyalkylene in which each alkylene includes 1 to 6 carbon atoms or is a divalent aromatic group having 6 to 16 carbon atoms; and A is a co-reactive functional group capable of reacting with pendent hydroxyl group of the oligomer for the incorporation of a free-radically polymerizable functional group.

An alternate but direct method of incorporation of the pendent ethylenically unsaturated group is to include a polyethylenically unsaturated monomer (such as ethylene glycol diacrylate, propylene glycol dimethacrylate, trimethylolpropane triacrylate, or 1,6-hexamethylenediol diacrylate) in the monomer mix. However, it has been determined that the use of such polyethylenically unsaturated monomers leads to extensive branching and/or crosslinking, and is therefore precluded in favor of the indirect method of functionalizing a portion of the pendent hydroxyl groups. Preferably, the curable composition contains no polyethylenically unsaturated monomer or other crosslinking agents.

The oligomer is prepared and then subsequently functionalized with the pendent, ethylenically unsaturated group. That is, the acrylic ester monomer, hydroxyl functional monomer and optional other polar monomer are combined and polymerized to produce the hydroxyl functional oligomer.

The oligomer may be prepared using radical polymerization techniques by combining an initiator and monomers in the presence of a chain transfer agent. In this reaction, a chain transfer agent transfers the active site on one growing chain to another molecule that can then start a new chain so the degree of polymerization may be controlled. The $M_w$ of the oligomer is 5 to 30K, preferably 8 to 15 k. It has been found if the degree of polymerization is too high, the composition is too high in viscosity, and not easily processable. Conversely, if the degree of polymerization is too low, the modulus, adhesion and other mechanical properties are diminished (at a constant degree of functionalization).

Chain transfer agents may be used when polymerizing the monomers described herein to control the molecular weight of the resulting oligomer. Suitable chain transfer agents include halogenated hydrocarbons (e.g., carbon tetrabromide) and sulfur compounds (e.g., lauryl mercaptan, butyl mercaptan, ethanethiol, and 2-mercaptoethyl ether, isooctyl thioglycolate, t-dodecylmercaptan, 3-mercapto-1,2-propanediol), and ethyleneglycol bisthioglycolate. The amount of chain transfer agent that is useful depends upon the desired molecular weight of the oligomer and the type of chain transfer agent. The chain transfer agent is typically used in amounts from about 0.1 parts to about 10 parts; preferably 0.1 to about 8 parts; and more preferably from about 0.5 parts to about 4 parts based on total weight of the monomers.

The monomers and optional chain transfer agent are combined and oligomerized in the presence of a chain transfer agent. More particularly, the adhesive is prepared by the steps of:

(i) providing an essentially solvent-free mixture comprising the free radically polymerizable monomers supra and at least one free-radical polymerization initiator, (ii) partially polymerizing said mixture to provide a partially polymerized mixture exhibiting a Brookfield viscosity of between 1,000 and 125,000 mPas at 20° C. and a degree of conversion of monomers to polymer of between 85-99 wt. %, preferably 90 to 98 wt. % with respect to the mass of the monomers prior to polymerization, (iii) converting a potion of the hydroxyl functional monomer units to pendent polymerizable (meth)acrylate groups, (iv) adding one or more photoinitiators and solvent diluent monomers to the partially polymerized mixture to provide a radiation-curable precursor, (iv) subsequently applying the radiation-curable precursor to a substrate, and (v) further polymerizing the radiation-curable precursor by subjecting it to actinic irradiation to provide said adhesive.

The present disclosure further relates to a radiation-curable precursor obtainable by performing steps (i)-(v) of the method of the present disclosure. The polymer obtained by conversion of the monomers to polymer to a degree of between 85-99 wt. % which is comprised in the radiation-curable precursor, preferably has a polydispersity $\rho=M_w/M_n$ between 1.5 and 4.

The mixture further comprises an effective amount of one or more free-radical polymerization initiators. The free-radical polymerization initiators and their amount and the polymerization conditions are selected to effect a partial polymerization of the mixture providing the required conversion of monomers to polymer to a degree of between 85-99 wt. % with respect to the mass of the monomers prior to polymerization, and a viscosity of the partially polymerized mixture of between 1,000-500,000 mPas at 20° C. The term "free-radical polymerization initiators" as used above and below includes initiators which can be thermally activated or activated by actinic radiation such as, in particular, UV-radiation.

Since the mixture preferably is partially prepolymerized in step (ii) under essentially adiabatic polymerization conditions, the mixture preferably comprises one or more thermally activatable free-radical polymerization initiators. Suitable thermally activatable free-radical polymerization initiators include organic peroxides, organic hydroperoxides, and azo-group initiators which produce free-radicals. Useful organic peroxides include but are not limited to compounds such as benzoyl peroxide, di-t-amyl peroxide, t-butyl peroxy benzoate, and di-cumyl peroxide. Useful organic hydroperoxides include but are not limited to compounds such as t-amyl hydroperoxide and t-butyl hydroperoxide. Useful azo-group initiators include but are not limited to the Vazo™ (compounds manufactured by DuPont, such as Vazo™ 52 (2,2'-azobis(2,4-dimethylpentanenitrile)), Vazo™ 64 (2,2'-azobis(2-methyl-propanenitrile)), Vazo™67 (2,2'-azobis(2-methylbutanenitrile)), and Vazo™88 (2,2'-azobis(cyclohexane-carbonitrile)).

The polymerization steps (ii) and (iii) may occur as a single step, or multiple steps. That is, all or a portion of the monomers and/or the initiator may be initially charged and partially polymerized. In some embodiments, there is an initial charge of monomers and initiator that is partially polymerized, then additional monomer and/or initiator is added, then further polymerized. Such multiple polymerization steps 1) helps narrow the polydispersity of the reaction, specifically reducing the amount of low molecular weight chains formed and 2) minimize the heat of reaction and 3) allows one to adjust the type and amount of monomer available during polymerization.

The term "essentially adiabatic polymerization" as used above and below means that total of the absolute value of any energy exchanged to or from the reaction system in which the polymerization of the mixture to a degree of conversion of between 30-60 wt. % to provide the partially polymerized mixture, takes place, will be less than about 15% of the total energy liberated during said polymerization of the mixture.

In the preferred method of the present disclosure, the reaction system in which the adiabatic polymerization of the mixture to a degree of conversion of monomers to polymer between 85-99 wt. % to provide the partially cured mixture takes place, preferably is a batch reactor. By reacting batch-wise is meant that the polymerization reaction of the mixture occurs in a vessel where the partially cured mixture may be drained from the vessel at the end of the polymerization and not continuously during the reaction. The monomers and initiators and, optionally, additives can be charged to the vessel at one time prior to reacting, in steps over time while reacting, or continuously over a time period while reacting, and the polymerization reaction is allowed to proceed for the necessary amount of time to achieve the desired degree of conversions of said one or more monomers to polymer to a degree of between 85-99 wt. %.

The degree of conversion can be measured by standard analytical methods, including IR spectroscopy and gravimetric analysis. Additional details regarding the adiabatic reaction process may be found in U.S. Pat. No. 7,691,437 (Ellis et al.), incorporated herein by reference.

The oligomer thus produced has the general formula:

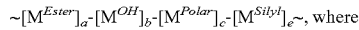

$\sim[M^{Ester}]_a\text{-}[M^{OH}]_b\text{-}[M^{Polar}]_c\text{-}[M^{Silyl}]_e\sim$, where -[$M^{Ester}$])- represents interpolymerized (meth)acrylate ester monomer units;
-[$M^{OH}$]- represents interpolymerized (meth)acryloyl monomer units having a pendent hydroxy group,
-[$M^{Polar}$] represent optional polar monomer units, and
[$M^{Silyl}$] represent optional silane-functional monomer units.

Subscripts a, b, c and e represent the parts by weight of each monomer unit. It will be understood that the oligomeric product of the adiabatic process further comprises unreacted monomer due to the partial conversion.

As previously described, a portion of the hydroxyl functional monomer units, -[$M^{OH}$]-, are converted to [$M^{Acryl}$] (meth)acryloyl monomer units having a pendent polymerizable (meth)acryloyl group to yield an oligomer of the formula:

$\sim[M^{Ester}]_a\text{-}[M^{OH}]_{b*}\text{-}[M^{Polar}]_c\text{-}[M^{Acryl}]_d\text{-}[M^{Silyl}]_e\sim$,
where

[$M^{Acryl}$] represents interpolymerized (meth)acryloyl monomer units having a pendent polymerizable (meth)acryloyl group, b* represents the parts by weight of the hydroxyl-functional monomer remaining after functionalization to produce [$M^{Acryl}$] and d represents the parts by weigh of the monomer units having pendent, free radically polymerizable monomer units. It will be apparent that b*+d will equal the value of b in the starting oligomer. A percent of the pendent hydroxyl groups are functionalized with (meth)acrylate groups to provide the oligomer with 1 to 10 wt. % of (meth)acrylate groups for subsequent polymerization. Post-functionalization, it is preferred that the oligomer comprises at least 10 wt. %, preferably at least 15 wt. % and most preferably at least 20 wt. %, of the hydroxyl functional monomer units so as to avoid the cloud point problems in humid environments.

The extant oligomeric mixture described supra is combined with a photoinitiator and additional diluent monomer, then further polymerized. The diluents monomers can be used to adjust the viscosity of the composition. Up to 50, preferably up to 20, more preferably up to 10, parts by weight of diluent monomer may be added.

The diluent monomers may be the same monomers described supra, in the amounts described. In some embodiments the diluent monomer component comprises:
80 to 100 parts by weight of (meth)acrylate ester monomers;
0 to 20 parts by weight of hydroxy-functional monomers;
0 to 5 parts by weight of polar monomers;
0 to 2 parts by weight of silyl functional monomers, wherein the sum of the monomer is 100 parts by weight. In some embodiments the hydroxyl-functional monomer is used in amounts such the curable composition (oligomer+diluent) has a hydroxyl content greater than $8.3 \times 10^{-4}$ mol OH/g.

The curable composition comprises less than 50 wt. % of the diluent monomers and greater than 50 wt. % of the solute oligomer, and a photoinitiator in concentrations ranging from about 0.001 to about 5.0 pbw, preferably from about 0.001 to about 1.0 pbw, and more preferably from about 0.01 to about 0.5 pbw, per 100 pbw of the monomers.

In the fourth step (iv), one or more photoinitiators are added to the partially polymerized mixture to provide the radiation-curable precursor. The term "photoinitiator" as used above and below comprises free-radical polymerization initiators which can be activated by some kind of actinic radiation such as for example, light sources, especially UV-light sources, or e-beam sources. Activation by light sources and, especially, UV-light sources is preferred. Free-radical radiation polymerization initiators which can be activated by light, are often referred to as free-radical photoinitiators. Radiation-curable precursors which include one or more photoinitiators are preferred. The free-radical photoinitiators which are suitable preferably include both type I and type II photoinitiators.

Type I photoinitiators are defined to essentially undergo a unimolecular bond cleavage reaction upon irradiation thereby yielding free-radicals. Suitable type I photoinitiators are selected from a group consisting of benzoin ethers, benzil ketals, .alpha.-dialkoxyacetophenones, .alpha.-hydroxyalkylphenones and acylphosphine oxides. Suitable type I photoinitiators are commercially available, for example, as Esacure™ KIP 100 from Lamberti Spa, Gallarate, Italy, or as Irgacure™ 651 from Ciba-Geigy, Lautertal, Germany.

Type II photoinitiators are defined to essentially undergo a bimolecular reaction where the photoinitiators interact in an excited state with a second compound acting as co-initiator, to generate free-radicals. Suitable type II photoinitiators are selected from a group comprising benzophenones, thioxanthones and titanocenes. Suitable co-initiators are preferably selected from a group comprising amine functional monomers, oligomers or polymers whereby amino functional monomers and oligomers are preferred. Both primary, secondary and tertiary amines can be used whereby tertiary amines are preferred. Suitable type 1 photoinitiators are commercially available, for example, as Esacure™ TZT from Lamberti Spa., Gallarate, Italy, or as 2- or 3-methylbenzophenone from Aldrich Co., Milwaukee, Wis. Suitable amine co-initiators are commercially available, for example, as GENOMER™ 5275 from Rahn AG, Zurich, Switzerland.

Photoinitiators may be used in the liquid compositions when curing with UV-radiation. Photoinitiators for free radical curing include organic peroxides, azo compounds, quinines, nitro compounds, acyl halides, hydrazones, mercapto compounds, pyrylium compounds, imidazoles, chlorotriazines, benzoin, benzoin alkyl ethers, ketones, phenones, and the like. For example, the adhesive compositions may comprise ethyl-2,4,6-trimethylbenzoylphenylphosphinate available as LUCIRIN™ TPO-L from BASF Corp. or 1-hydroxy-cyclohexyl phenyl ketone available as IRGACURE™ 184 from Ciba Specialty Chemicals.

The total amount of photoinitiators and, optionally, of one or more co-initiators typically is in the range of about 0.001 wt. % to about 5 wt. % and preferably in the range of about 0.1 wt. % to about 3 wt. % with respect to the mass of the curable composition.

The radiation-curable precursor (oligomer and diluent) has a Brookfield viscosity of between 1,000 to 500,000 mPas, preferably of between 2,000 and 125,000 mPas, more preferably between 2,000 to 75,000 and especially preferably of between 2,000 and 50,000 mPas at 20° C. If the radiation-curable composition is applied to a substrate by printing it preferably has a Brookfield viscosity at 20° C. of between 1,000 and 30,000 mPas and more preferably between 2,000 and 25,000 mPas.

The curable composition comprising the oligomer, diluents monomer(s) and photoinitiator is thoroughly mixed and subsequently applied to a substrate in the fifth step (v). Because of its low viscosity the composition can be applied to a substrate by conventional coating methods such as knife-coating, gravure coating, curtain coating, air knife coating and roll-coating. In some embodiments the curable composition is applied by dispensing a fixed amount of adhesive over the bonding area. This may be applied by applying dots and/or lines via a needle, needle die or slot die. The entire area may be coated by spray coating, die coating, draw bar coating or curtain coating. A "dam and fill" method may be used, precuring a dam of liquid optically clear adhesive around the perimeter of the bonding area and then filling the bonding area using any of the methods described above. The dam may also be in the form of a tape, or a foam and/or rubber gasket. The area may be coated using stencil printing or screen printing without the aid of a dam. Additional information regarding these deposition methods may be found in WO 2011/119828, WO 2011/84405, U.S. 2010/0265444 and U.S. 2009/0283211 (Busman et al.), incorporated herein by reference.

Subsequent to its application to a substrate the precursor is further polymerized in step (v) by subjecting it to actinic irradiation and preferably to UV-irradiation. Actinic radiation from any source and of any type can be used for the curing of the composition whereby light sources are preferred over e-beam sources. The light can be in the form of parallel rays or divergent beams. Since many photoinitiators generating free-radicals exhibit their absorption maximum in the ultraviolet (UV) range, the light source is preferably selected to emit an effective amount of such radiation. Suitable light sources include carbon arc lamps, mercury vapor lamps, fluorescent lamps comprising ultraviolet light-emitting phosphors, ultraviolet light-emitting diodes, argon glow lamps and photographic flood lamps. Preferred are high-intensity light sources having a lamp power density of at least 80 mW/cm$^2$ and more preferably of at least 120 mW/cm$^2$.

When subjecting the curable composition to actinic irradiation and, in particular, to UV-irradiation, the precursor is cured via a free-radical polymerization mechanism. The composition is termed as "fully cured" when the conversion of the oligomer and diluents monomers to polymer is at least 90%, more preferably at least 95%, especially preferably at least 97.5% and most preferably at least 99%.

The energy density applied preferably is 100-5,000 mJ/cm$^2$ and more preferably 300-3000 mJ/cm$^2$ for curing a 250 μm thick layer of the radiation-curable composition.

The curable composition and the photoinitiator may be irradiated with activating UV radiation to polymerize the monomer component(s). UV light sources can be of two types: 1) relatively low light intensity sources such as Blacklights which provide generally 10 mW/cm$^2$ or less (as measured in accordance with procedures approved by the United States National Institute of Standards and Technology as, for example, with a UVIMAP UM 365 L-S radiometer manufactured by Electronic Instrumentation & Technology, Inc., in Sterling, Va.) over a wavelength range of 280 to 400 nanometers; and 2) relatively high light intensity sources such as medium pressure mercury lamps which provide intensities generally greater than 10 mW/cm$^2$, preferably 15 to 450 mW/cm$^2$.

Further components and additives may be included into the curable composition such as, for example, heat stabilizers, antioxidants, antistatic agents, thickeners, fillers, pigments, dyes, colorants, thixotropic agents, processing aides, nanoparticles, fibers and any combination thereof in amounts such that the optical properties of the adhesive are not significantly compromised. Such additives are generally in an amount of between 0.01 and 10 wt. % and more preferably in an amount of between 0.05 and 5 wt. % with respect to the mass of curable composition. In some embodiment the curable composition and subsequent adhesive contain no such additives.

In some embodiments the curable composition may further comprise metal oxide particles to modify the refractive index of the adhesive layer or the viscosity of the liquid adhesive. Metal oxide particles that are substantially transparent may be used. Metal oxide particles may be used in an amount needed to produce the desired effect, for example, in an amount from about 1 to about 10 weight percent, from about 3.5 to about 7 weight percent, from about 10 to about 85 weight percent, or from about 40 to about 85 weight percent, based on the total weight of the curable composition. Metal oxide particles may only be added to the extent that they do not add undesirable color, haze or transmission characteristics. Generally, the particles can have an average particle size of from about 1 nm to about 100 nm.

The metal oxide particles can be surface treated to improve dispersibility in the adhesive layer and the composition from which the layer is coated. Examples of surface treatment chemistries include silanes, siloxanes, carboxylic acids, phosphonic acids, zirconates, titanates, and the like. Techniques for applying such surface treatment chemistries are known.

In some embodiments, the adhesive layer comprises a fumed silica. Suitable fumed silicas include, but are not limited to: AEROSIL™ 200; AEROSIL™ R805; and EVONIK™ VP NKC 130 (both available from Evonik Industries); CAB-O-SIL™ TS 610; and CAB-O-SIL™ T 5720 (both available from Cabot Corp.), and HDK™ H20RH (available from Wacker Chemie AG). In some embodiments, the adhesive layer comprises a fumed aluminum oxide, such as AEROXIDE™ ALU 130 (available from Evonik, Parsippany, N.J.). In some embodiments, the adhesive layer comprises clay such as GARAMITE™ 1958 (available from Southern Clay Products).

In some embodiments, the liquid optically clear adhesive comprises non-reactive oligomeric rheology modifiers. While not wishing to be bound by theory, non-reactive oligomeric rheology modifiers build viscosity at low shear rates through hydrogen bonding or other self-associating mechanisms. Examples of suitable non-reactive oligomeric rheology modifiers include, but are not limited to: polyhydroxycarboxylic acid amides (such as BYK 405, available from Byk-Chemie GmbH, Wesel, Germany), polyhydroxycarboxylic acid esters (such as BYK R-606™, available from Byk-Chemie GmbH, Wesel, Germany), modified ureas (such as DISPARLON 6100™, DISPARLON 6200™ or DISPARLON 6500™ from King Industries, Norwalk, Conn. or BYK 410™ from Byk-Chemie GmbH, Wesel, Germany), metal sulfonates (such as K-STAY™ 501 from King Industries, Norwalk, Conn. or IRCOGEL 903™ from Lubrizol Advanced Materials. Cleveland, Ohio), acrylated oligoamines (such as GENOMER 5275™ from Rahn USA Corp, Aurora, Ill.), polyacrylic acids (such as CARBOPOL 1620™ from Lubrizol Advanced Materials, Cleveland, Ohio), modified urethanes (such as K-STAY 740™ from King Industries, Norwalk, Conn.), micronized amide waxes (such as CRAYVALLAC SLT™ from Arkema), micronized amide modified castor oil waxes (such as CRAYVALLAC MT™ from Arkema), micronized castor oil derived waxes (such as CRAYVALLAC ANTISETTLE CVP™ from Arkema), pre-activated amide wax dispersed in (meth)acrylate monomers (such as CRAYVALLAC E00054) or polyamides. In some embodiments, non-reactive oligomeric rheology modifiers are chosen to be miscible and compatible with the optically clear adhesive to limit phase separation and minimize haze.

In some embodiments, the adhesive layer may be formed from a thixotropic liquid optically clear adhesive. As used herein, a composition is considered thixotropic if the composition shear thins, i.e., viscosity decreases when the composition is subjected to a shearing stress over a given period of time with subsequent recovery or partial recovery of viscosity when the shearing stress is decreased or removed. Such adhesives exhibit little or no flow under zero or near-zero stress conditions. The advantage of the thixotropic property is that the adhesive can be dispensed easily by such processes as needle dispensing due to the rapid decrease in viscosity under low shear rate conditions. The main advantage of thixotropic behavior over simply high viscosity is that high viscosity adhesive is difficult to dispense and to flow during application. Adhesive compositions can be made thixotropic by adding particles to the compositions. In some embodiments, fumed silica is added to impart thixotropic properties to a liquid adhesive, in an amount of from about 2 to about 10 wt. %, or from about 3.5 to about 7 wt. %.

In some embodiments, the curable composition optionally comprises a thixotropic agent. As used herein, a composition is considered thixotropic if the composition shear thins, i.e., viscosity decreases when the composition is subjected to a shearing stress over a given period of time with subsequent recovery or partial recovery of viscosity when the shearing stress is decreased or removed. Such adhesives exhibit little or no flow under zero or near-zero stress conditions. The advantage of the thixotropic property is that the adhesive can be dispensed easily by such processes as needle dispensing due to the rapid decrease in viscosity under low shear rate conditions. The main advantage of thixotropic behavior over simply high viscosity is that high viscosity adhesive is difficult to dispense and to flow during application. Adhesive compositions can be made thixotropic by adding particles to the compositions. In some embodiments, fumed silica is added to impart thixotropic properties to a liquid adhesive, in an amount of from about 2 to about 10 weight percent, or from about 3.5 to about 7 weight percent. The efficiency of the thixotropic agent and the optical properties depend on the composition of the liquid optically clear adhesive and its interaction with the thixotropic agent. For example, in the case of associative thixotropes or hydrophilic silica, the presence of highly polar monomers such as acrylic acid, monomers or oligomers may disrupt the thixotropic or optical performance. Consequently, it is preferred that the curable composition contain no acid-functional monomers or oligomers.

In some embodiments, any liquid optically clear adhesive having a viscosity of no more than 30 Pa·s, between about 2 and about 30 Pa·s and particularly between about 5 and about 20 Pa·s at a shear rate of 1 to 10 sec$^{-1}$ can be combined with a thixotropic agent to form a thixotropic liquid optically clear adhesive suitable for stencil printing or screen printing. The efficiency of the thixotropic agent and the optical properties depend on the composition of the liquid optically clear adhesive and its interaction with the thixotropic agent. For example, in the case of associative thixotropes or hydrophilic silica, the presence of highly polar monomers such as acrylic acid, acid or hydroxyl containing monomers or oligomers may disrupt the thixotropic or optical performance.

The curable composition optionally comprises a plasticizer that increases its softness and flexibility to the resultant adhesive. Plasticizers are well known and typically do not participate in polymerization of (meth)acrylate groups. The plasticizer may comprise more than one plasticizer material. The adhesive may comprise from greater than 1 to about 20 weight percent, or from greater than 3 to about 15 weight percent, of the plasticizer. The particular plasticizer used, as well as the amount used, may depend on a variety of factors.

The curable composition may comprise a tackifier. Tackifiers are well known and are used to increase the tack or other properties of an adhesive. There are many different types of tackifiers but nearly any tackifier can be classified as: a rosin resin derived from wood rosin, gum rosin or tall oil rosin; a hydrocarbon resin made from a petroleum-based feedstock; or a terpene resin derived from terpene feedstocks of wood or certain fruits. The adhesive layer may comprise, e.g., from 0.01 to about 20 weight percent, from 0.01 to about 15 weight percent, or from 0.01 to about 10 weight percent of tackifier. The adhesive layer may be free of tackifier.

The adhesive resulting from photopolymerization of the curable composition is desirably optically clear. As used herein, the term "optically clear" refers to a material that has a luminous transmission of greater than about 90 percent, a haze of less than about 2 percent, and opacity of less than about 1 percent in the 350 to 800 nm wavelength range. Both the luminous transmission and the haze can be determined using, for example, ASTM-D 1003-95. Typically, the optically clear adhesive may be visually free of bubbles.

The adhesive layer desirably maintains optical clarity, bond strength, and resistance to delamination over the lifetime of the article in which it is used. Whether an adhesive will likely have these desirable characteristics can be determined using an accelerated aging test. The adhesive layer can be positioned between two substrates for this test. The resulting laminate is then exposed to elevated temperatures, optionally, combined with elevated humidity conditions, for a period of time. For example, the adhesive layer can often retain its optical clarity after aging at 85° C. for approximately 500 hours without humidity control (i.e., the relative humidity in the oven is usually below about 10 percent or below about 20 percent). Alternatively, the adhesive can often retain its optical clarity after aging at 65° C. for approximately 72 hours with a relative humidity of about 90 percent. Most importantly, the cloud point resistant adhesive can often retain its optical clarity after aging at 65° C. for approximately 72 hours with a relative humidity of about 90 percent and rapid (i.e. within minutes) cooling to ambient conditions. After aging, the average transmission of the adhesive between 350 nanometers (nm) and 800 nm can be greater than about 85 percent and the haze can be less than about 2 percent.

The adhesive resulting from photopolymerization of the curable composition desirably has a shear modulus of 5000 to 1,000,000, preferably 5000 to 100,000, more preferably 5000 to 50,000 pascals.

Laminates are provided that include an optical film or optically clear substrate and a optically clear adhesive layer adjacent to at least one major surface of the optical film or substrate. The articles can further include another substrate (e.g., permanently or temporarily attached to the adhesive layer), another adhesive layer, or a combination thereof. As used herein, the term "adjacent" can be used to refer to two layers that are in direct contact or that are separated by one or more thin layers, such as primer or hard coating. Often, adjacent layers are in direct contact. Additionally, laminates are provided that include an adhesive layer positioned between two substrates, wherein at least one of the substrates is an optical film. Optical films intentionally enhance, manipulate, control, maintain, transmit, reflect, refract, absorb, retard, or otherwise alter light that impinges upon a surface of the film. Films included in the laminates include classes of material that have optical functions, such as polarizers, interference polarizers, reflective polarizers, diffusers, colored optical films, mirrors, louvered optical film, light control films, transparent sheets, brightness enhancement film, anti-glare, and anti-reflective films, and the like. Films for the provided laminates can also include retarder plates such as quarter-wave and half-wave phase retardation optical elements. Other optically clear films include anti-splinter films and electromagnetic interference filters.

In some embodiments, the resulting laminates can be optical elements or can be used to prepare optical elements. As used herein, the term "optical element" refers to an article that has an optical effect or optical application. The optical elements can be used, for example, in electronic displays, architectural applications, transportation applications, projection applications, photonics applications, and graphics applications. Suitable optical elements include, but are not limited to, glazing (e.g., windows and windshields), screens or displays, cathode ray tubes, and reflectors.

Exemplary optically clear substrates include, but are not limited to a display panel, such as liquid crystal display, an OLED display, a touch panel, electrowetting display or a cathode ray tube, a window or glazing, an optical component such as a reflector, polarizer, diffraction grating, mirror, or cover lens, another film such as a decorative film or another optical film.

Representative examples of optically clear substrates include glass and polymeric substrates including those that contain polycarbonates, polyesters (e.g., polyethylene terephthalates and polyethylene naphthalates), polyurethanes, poly(meth)acrylates (e.g., polymethyl methacrylates), polyvinyl alcohols, polyolefins such as polyethylenes, polypropylenes, and cellulose triacetates. Typically, cover lenses can be made of glass, polymethyl methacrylates, or polycarbonate.

The laminates have at least one of the following properties: the adhesive layer has optical transmissivity over a useful lifetime of the article, the adhesive can maintain a sufficient bond strength between layers of the article, the adhesive can resist or avoid delamination, and the adhesive can resist bubbling of the adhesive layer over a useful lifetime. The resistance to bubble formation and retention of optical transmissivity can be evaluated using accelerated aging tests.

The adhesive compositions of the present disclosure may be applied directly to one or both sides of an optical element such as a polarizer. The polarizer may include additional layers such as an anti-glare layer, a protective layer, a reflective layer, a phase retardation layer, a wide-angle compensation layer, and a brightness enhancing layer. In some embodiments, the adhesives of the present disclosure may be applied to one or both sides of a liquid crystal cell. It may also be used to adhere a polarizer to a liquid crystal cell. Yet another exemplary set of optical laminates include the application of a cover lens to a LCD panel, the application of a touch panel to an LCD panel, the application of a cover lens to a touch panel, or combinations thereof.

EXAMPLES

| Materials | |
|---|---|
| Abbreviation or Trade Name | Description |
| IOA | Isooctyl acrylate, available under the trade designation "SR440" from Sartomer USA, LLC, Exton, Pennsylvania. |
| 2-EHA | 2-ethylhexyl acrylate, available from Sigma-Aldrich Co. LLC., St. Louis, Missouri. |
| 2-PHA | 2-propylheptyl acrylate, available under the trade designation "2-PHA" from BASF Corporation, Florham Park, New Jersey. |
| TDA | Tridecyl Acrylate, available under the trade designation "SR489D" from Sartomer USA. |
| C16 | 2-hexyldecyl acrylate, available under the trade designation "HEDA 16" from Toho Chemical Industry Co. Ltd, Kanagawa, Japan. |
| LA | Lauryl Acrylate, available under the trade designation "SR335" from Sartomer USA. |
| IBOA | Isobornyl Acrylate, available under the trade designation "SR506D" from Sartomer USA. |
| ODA | Octadecyl acrylate, available from Sigma-Aldrich Co. LLC., St. Louis, Missouri. |
| 4-HBA | 4-hydroxybutyl acrylate, available under the trade designation "4-HBA" from San Esters Corporation, New York, New York. |
| 2-HPMA | 2-hydroxypropyl methacrylate, available from Alfa Aesar, Heysham England. |
| IEM | Isocyanatoethyl methacrylate, available from Showa Denko, Kanagawa, Japan. |
| EGBTG | Ethylene glycol bisthioglycolate, available from Evans Chemitics LP, Teaneck, New Jersey. |
| PPA6 | Polypropylene glycol monoacrylate, available under the trade designation "Bisomer PPA6" from" from Cognis, Cincinatti, Ohio. |
| 2EEEA | 2-ethoxyethoxyethyl acrylate, available from Polysciences, Inc., Warrington Pennsylvania. |
| VAZO 52 | 2,2'-Azobis(2,4-dimethylpentanenitrile), available under the trade designation "VAZO 52" from E. I. du Pont de Nemours and Co., Wilmington, Delaware. |

-continued

| Abbreviation or Trade Name | Description |
|---|---|
| VAZO 88 | 1,1'-Azobis(cyanocyclohexane), available under the trade designation "VAZO 88" from E. I. du Pont de Nemours and Co. |
| L130 | 2,5-Dimethyl-2,5-di-(tert-butylperoxy)hexyne-3, available under the trade designation "Lupersol 130" from Pennwalt Corporation, Buffalo, New York. |
| L101 | 2,5-bis(tert-butylperoxy)-2,5-dimethylhexane available under the trade designation "Lupersol 101" from Pennwalt Corporation. |
| TPO-L | Ethyl-2,4,6-trimethylbenzoylphenylphosphinate, available under the trade designation "Lucirin TPO-L" from BASF Corporation, Florham Park, New Jersey. |
| A174 | 3-methacyrloxypropyltrimethoxysilane, available under the trade designation "Silquest A-174" from Momentive, Columbus, Ohio. |
| 2HD | 2-hexyl-1-decanol, available from Sigma-Aldrich Co. LLC. |
| TEA | Triethylamine, available from Alpha Aesar. |
| AC | Acryloyl chloride, available from Alpha Aesar. |
| IRG 1010 | Pentaerythritol tetrakis(3-(3,5-di-tert-butyl-4-hydroxyphenyl)propionate), a phenolic primary antioxidant available under the trade designation "IRGANOX 1010" from Ciba Specialty Chemicals, Inc., Basel, Switzerland. |
| IRG 1076 | Octadecyl-3-(3,5-di-tert.butyl-4-hydroxyphenyl)-propionate, a phenolic primary antioxidant available under the trade designation "IRGANOX 1076" from Ciba Specialty Chemicals, Inc. |
| MEHQ | Hydroquinone monomethyl ether, available from Alfa Aesar, Heysham England. |
| VP NKC 130 | A hydrophobically treated fumed silica, surface treatment of hexadecylsilane, available under the trade designation "AEROSIL VP NKC 130" from Evonik Industries, Parsippany, New Jersey. |
| MPEG | Poly(ethylene glycol) methyl ether acrylate, available from Sigma-Aldrich Co. LLC. |

Test Methods

Viscosity Measurement

Viscosity measurements were made by using an AR2000 Rheometer equipped with a 40 mm, 1° stainless steel cone and a plate available from TA Instruments, New Castle, Del. Viscosities were measured at 25° C. using a steady state flow procedure with a frequency from 0.001 to 100 sec$^{-1}$ with a 28 μm gap between the cone and the plate. Viscosity values are reported in centipoise (cps) at a shear rate of 1 sec$^{-1}$.

Molecular Weight Determination

The molecular weight distribution of the compounds was characterized using conventional gel permeation chromatography (GPC). The GPC instrumentation, which was obtained from Waters Corporation, Milford, Mass., included a high pressure liquid chromatography pump (Model 1515HPLC), an auto-sampler (Model 717), a UV detector (Model 2487), and a refractive index detector (Model 2410). The chromatograph was equipped with two 5 micron PLgel MIXED-D columns available from Varian Inc, Palo Alto, Calif.

Samples of polymeric solutions were prepared by dissolving polymer or dried polymer samples in tetrahydrofuran at a concentration of 0.5 percent (weight/volume) and filtering through a 0.2 micron polytetrafluoroethylene filter that is available from VWR International, West Chester, Pa. The resulting samples were injected into the GPC and eluted at a rate of 1 milliliter per minute through the columns maintained at 35° C. The system was calibrated with polystyrene standards using a linear least squares fit analysis to establish a calibration curve. The weight average molecular weight (Mw) and the polydispersity index (weight average molecular weight divided by number average molecular weight) were calculated for each sample against this standard calibration curve.

Pluck Adhesion

Two float glass slides, 2¼ inch (5.72 cm)×1³⁄₁₆ inch (4.60 cm)×¼ inch (0.635 cm) were cleaned with isopropyl alcohol (IPA). Two layers of SCOTCH Filament Tape 898, available from the 3M Company, St. Paul, Minn., were attached along the two, 1³⁄₁₆ inch (4.60 cm) length edges of the first substrate in order to control the thickness of the adhesive composition, once it was placed on the slide. The tape created a step height of about 340 microns. The adhesive composition was dispensed by a pipette in the center of the slide and the second slide was slowly brought into contact with the first slide. The adhesive composition between the slides was cured with the total energy of 3,000 mJ/cm$^2$ in UV-A or UV-B region under a Fusion UV lamp available from Fusion UV Systems Inc., Gaithersburg, Md., using a quartz UV D-bulb (Examples 9 through 19 and 26 through 31). The remaining samples (Examples 1 through 8 and 20 through 25) were cured under an Omnicure 2000 high pressure Hg spot cure source available from EXFO Photonic Solutions, Inc., Mississauga, Ontario, Canada, with the total energy of 3,000 mJ/cm$^2$ in UV-A region. Samples then dwelled for one day in a controlled temperature-humidity (CTH) room at a temperature of 74° F. (23.3° C.) and a relative humidity of 50% prior to testing.

A glass slide with cured adhesive was loaded into a sliding pluck fixture on an MTS INSIGHT Electromechanical Test System with a 5 kN load cell available from MTS Systems Corporation, Eden Prairie, Minn. The samples were pulled apart at 25 mm/min and tested to failure. The first measured peak load was then divided by the measured area of the adhesive composition on the pluck sample to determine the pluck adhesion, measured in N/cm$^2$. At least three samples were tested for each adhesive composition, with an average value for pluck adhesion reported.

Shrinkage

Percent volume shrinkage was measured using an Accupyc II 1340 Pycnometer from Micromeritics Instrument Corporation, Norcross, Ga. An uncured adhesive composition sample of known mass was placed in the silver vial of the pycnometer. The vial was placed in the pycnometer and the volume of the sample was measured and the density of the adhesive composition was determined based on the volume and mass of the sample. The density of a cured adhesive composition was measured following the same procedure as that of the uncured. Cured adhesive compositions were prepared by casting a hand spread coating of the adhesive composition between two release liners, using an 11 mil (0.28 mm) thickness adjuster, and curing with the total energy of 4,000 mJ/cm$^2$ in UV-A region under a Fusion UV lamp with a quartz UV D bulb available from Fusion UV Systems Inc. Volume shrinkage was then calculated from the following equation:

$$\{[(1/\text{Avg Liquid Density}) - (1/\text{Avg Cured Density})]/(1/\text{Avg Liquid Density})\} \times 100\%$$

Optical Measurements

Optical properties of the adhesive compositions were measured by sandwiching the adhesive composition between two 2 inch (5.08 cm)×3 inch (7.62 cm)×200 microns LCD glass panels, EAGLE 2000 available from Specialty Glass Products, Willow Grove, Pa. The adhesive composition was cured with a total energy of 3,000 mJ/cm$^2$ in UV-A region using a Fusion UV lamp with a quartz UV D bulb, available from Fusion UV Systems Inc. The thickness of the adhesive composition was controlled by applying two layers of SCOTCH Filament Tape 898, 3M Company, along the two, 2 inch (5.08 cm) edges of one of the panels. Haze, transmission and color of the cured LOCAs were measured before and after aging under environmental testing conditions using a HunterLab UltraScan PRO available from Hunter Associates Laboratory, Inc, Reston, Va.

Preparation of Solute (Meth)Acryolyl Oligomers (SMAOs)
Preparation of SMAO-1

This example illustrates the process to produce a solute (meth)acryolyl oligomer. Two essentially adiabatic reaction cycles are used with option of a third functionalization step, after initial polymer synthesis. To a 5 L stainless steel reaction vessel was added: 1,880 g TDA, 500 g 4-HBA, 40.0 g EGBTG, 2.5 g IRG 1010, and 20.5 g of 2.44 wt % MEHQ in IOA. The mixture was heated to 60° C. and mechanically stirred until all components were dissolved, at which time 60.1 g of 0.125 wt % solids VAZO 52 in IOA was added to the reactor. Once the polymerization had begun the temperature control system was set to cause the temperature of the jacket to track 1.5° C. above the batch temperature to facilitate adiabatic reaction conditions. At 120° C. the jacket stopped tracking the polymerization temperature, which peaked at 132° C. and was allowed to cool back to 60° C. before being depressurized. A sample was taken of the reaction mixture and the unreacted monomer was 27.73% based on the total weight of the mixture.

The following components were charged to a 4oz glass jar: 1.0 g VAZO 52, 0.45 g VAZO 88, 0.45 g L101, and 48.10 g ethyl acetate. The solution was shaken in a reciprocating mixer until all solids were dissolved, at which point, 25.0 g of the ethyl acetate solution and 13.33 g EGBTG were added to the stainless steel reaction vessel and stirred at 60° C. The reaction peaked at 110° C. at which time 50 g of IEM was added. The reactor was cooled to 100° C. and held isothermally for 4 hours and then drained, producing SMAO-1. The SMAO was stored in 32 oz brown jars. A sample was taken of the reaction mixture and the unreacted monomer was 4.38%, based on the total weight of the mixture.

Preparation of SMAO-2 Through SMAO-17

132.5 g of LA, 220 g of 4-HBA, 192.5 g IBOA and 6.6 g of EGBTG were added to a four neck flask equipped with a reflux condenser, thermocouple, mechanical stirrer, and a gas inlet that allows nitrogen or air to be bubbled into the solution. The first charge of thermal initiators, VAZO 52 (0.0248 g), VAZO 88 (0.0248 g) and L130 (0.0248 g) were also added to the flask. The mixture was stirred and heated to 60° C. under nitrogen. The temperature of the reaction mixture quickly exothermed and peaked at around 160° C., during the polymerization. After the reaction peak, a second charge of VAZO™ 88 (0.0248 g) dissolved in an additional 5 g of LA was added to the flask. The reaction vessel was held at 160° C. for 90 minutes before cooling to 100° C. and purging with air.

11 g of IEM was then added to the batch to react with the pendant hydroxyl groups on the LA/4-HBA/IBOA/EGBTG oligomer chains, incorporating methacrylate functional groups to the oligomer. The reactor vessel was held at 100° C. for 4 hours and then cooled and drained, producing SMAO-2. A sample was taken, at the end of this reaction period, for oligomer molecular weight determination by GPC, Table 2.

A similar procedure was used to produce SMAO-3 through SMAO-17. The monomers and amounts used to prepare these additional oligomers are shown in Tables 1 through 3 below, as well as, molecular weight data. Note that VAZO™ 88 is added in two steps, the amount of VAZO in each step being half that indicated in Tables 1 through 3. Also, during the second charge of VAZO 88, the VAZO 88 was dissolved in 5 g of acrylate, the major acrylate ester component of the composition. This 5 g of acrylate is included in the values reported in the Tables 1 through 3.

TABLE 1

Formulations of SMAO-2 through SMAO-8.

| Component | SMAO-2 | SMAO-3 | SMAO-4 | SMAO-5 | SMAO-6 | SMAO-7 | SMAO-8 |
|---|---|---|---|---|---|---|---|
| IOA | — | — | — | 211.5 | — | — | — |
| LA | 137.5 | — | — | — | — | — | — |
| TDA | — | 246 | — | — | 271.2 | 258 | 241.5 |
| C16 | — | — | 241.5 | — | — | — | — |
| 4-HBA | 220 | 42 | 76.5 | 66.5 | — | 66 | 76.5 |
| PPA6 | — | — | — | — | — | — | — |
| 2-HPMA | — | — | — | — | 46.8 | — | — |
| IBOA | 192.5 | — | — | — | — | — | — |
| EGBTG | 6.6 | 4.2 | 4.29 | 4.06 | 5.61 | 4.62 | 4.62 |
| VAZO 52 | 0.0248 | 0.0135 | 0.0264 | 0.0131 | 0.0149 | 0.0149 | 0.0149 |
| VAZO 88 | 0.0496 | 0.0270 | 0.0528 | 0.0262 | 0.030 | 0.030 | 0.030 |
| L130 | 0.0248 | 0.0135 | 0.0264 | 0.0131 | 0.0149 | 0.0149 | 0.0149 |
| IEM | 11 | 6 | 6.6 | 5.8 | 6.6 | 6.6 | 6.6 |
| Mw (Dal) | 25,810 | 16,700 | 12,300 | 11,000 | 12,400 | 15,100 | 17,000 |

TABLE 2

Formulations of SMAO-9 through SMAO-11.

| Component | SMAO-9 | SMAO-10 | SMAO-11 |
|---|---|---|---|
| 2-PHA | 219 | — | — |
| TDA | — | 204 | 251.4 |
| ODA | — | 42 | — |
| 4-HBA | 69 | 48 | 72.6 |
| PPA6 | — | — | — |
| 2-HPMA | — | — | — |
| IBOA | — | — | — |
| EGBTG | 4.35 | 4.2 | 4.62 |
| VAZO 52 | 0.0135 | 0.0135 | 0.0149 |
| VAZO 88 | 0.0270 | 0.027 | 0.03 |
| L130 | 0.0135 | 0.0135 | 0.0149 |
| IEM | 6 | 6 | 6.6 |
| Mw (Dal) | 12,500 | 14,300 | 17,300 |

TABLE 3

Formulations of SMAO-12 through SMAO-17.

| Component | SMAO-12 | SMAO-13 | SMAO-14 | SMAO-15 | SMAO-16 | SMAO-17 |
|---|---|---|---|---|---|---|
| 2-EHA | 271.2 | — | 271.2 | — | 234 | — |
| TDA | — | 265.08 | — | 355.2 | — | 220.71 |
| 4-HBA | 23.1 | 15.84 | 23.1 | 30.1 | — | 18.15 |
| PPA6 | — | — | — | — | 54 | — |
| MPEG | — | — | 29.7 | 38.7 | — | — |
| 2EEEA | 29.7 | 73.1 | — | — | — | 85.14 |
| EGBTG | 4.29 | 5.04 | 4.29 | 6.02 | 6 | 4.62 |
| VAZO 52 | 0.0149 | 0.0162 | 0.0149 | 0.194 | 0.0135 | 0.0149 |
| VAZO 88 | 0.030 | 0.0324 | 0.030 | 0.0388 | 0.0270 | 0.030 |
| L130 | 0.0149 | 0.0162 | 0.0149 | 0.0194 | 0.0135 | 0.0149 |
| IEM | 6.6 | 5.04 | 6.6 | 8.6 | 6 | 5.61 |
| Mw (Dal) | 11,200 | 14,900 | 12,300 | 19,000 | 9,100 | 10,500 |

Preparation of SMAO-18

To a 5 L stainless steel reaction vessel was added 2,779 g TDA, 665 g 4-HBA, 57.8 g EGBTG, and 28.7 g of 2.44 wt % MEHQ in TDA. The mixture was heated to 60° C. and mechanically stirred until all components were dissolved, at which time 28.1 g of 0.5 wt % solids VAZO 52 in TDA was added to the reactor. Once the polymerization had begun the temperature control system was set to cause the temperature of the jacket to track 1.5° C. above the batch temperature to facilitate adiabatic reaction conditions. At 120° C. the jacket stopped tracking the polymerization temperature, which peaked at 134° C. and was allowed to cool back to 60° C. before being depressurized. A sample was taken of the reaction mixture and the unreacted monomer was 43.68% based on the total weight of the mixture.

The following components were charged to a 4oz glass jar: 1.0 g VAZO 52, 0.45 g VAZO 88, 0.45 g L101, and 48.10 g ethyl acetate. The solution was shaken in a reciprocating mixer until all solids were dissolved, at which point 35.0 g of the ethyl acetate solution and 19.25 g EGBTG were added to the stainless steel reaction vessel and stirred at 60° C. The reaction peaked at 110° C. The reactor was then cooled to 100° C. while it was purged with 90/10 nitrogen/oxygen control gas for 30 minutes, at which time 70.0 g of IEM were added to the reactor and held at 100° C. isothermally for 2 hours. After 2 hours 1 kg of material was drained from the reaction vessel into brown tinted jars. A sample was taken of the reaction mixture from this step and the unreacted monomer was 5.07% based on the total weight of the mixture.

Preparation of Adhesive Compositions

Examples 1 Through 31

Adhesive compositions were prepared by charging the component materials, disclosed in Tables 4 through 7, into a white mixing container available from FlackTek Inc., Landrum, S.C., and mixed using a Hauschild SPEEDMIXER DAC 150 FVZ available from FlackTek Inc. operating at 3540 rpm for 6 minutes. The exceptions to this were Examples 26 through 31, which were mixed with Hauschild SPEEDMIXER DAC 600 FV available from FlackTek Inc. operating at 2200 rpm for 4 minutes. Material properties; shrinkage, viscosity and pluck adhesion and optical properties before and after aging under environmental conditions; are described in Tables 8 through 17.

TABLE 4

Adhesive Compositions of Examples 1-9 (values are in grams).

| Material | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| SMAO-3 | 22.225 | — | — | — | — | — | — | — | — |
| SMAO-8 | — | 20.975 | — | — | — | — | — | — | — |
| SMAO-5 | — | — | 22.225 | 22.225 | — | — | — | — | — |
| SMAO-16 | — | — | — | — | 22.225 | — | — | — | — |
| SMAO-9 | — | — | — | — | — | 20.975 | — | — | — |
| SMAO-4 | — | — | — | — | — | — | 20.975 | — | — |
| SMAO-10 | — | — | — | — | — | — | — | 22.225 | — |
| SMAO-11 | — | — | — | — | — | — | — | — | 31.46 |
| PPA6 | 2.24 | — | 6.53 | — | 12.39 | — | — | 3.0 | — |
| TDA | — | 4.35 | — | — | — | — | — | — | 4.5 |
| IOA | — | — | 0.063 | 0.063 | — | — | — | — | — |
| 4-HBA | — | — | — | 2.233 | — | — | — | — | — |
| 2-PHA | — | — | — | — | — | 4.525 | — | — | — |
| C16 | — | — | — | — | — | — | 4.5 | — | — |
| TPO-L | 0.251 | 0.250 | 0.251 | 0.251 | 0.251 | 0.250 | 0.250 | 0.270 | 0.375 |
| A174 | 0.028 | 0.025 | 0.028 | 0.028 | 0.028 | 0.025 | 0.025 | 0.028 | 0.044 |

TABLE 5

Adhesive Compositions of Examples 10-19 (values are in grams).

| Material | Ex. 10 | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|
| SMAO-1 | 20.0 | 20.0 | 20.0 | 20.0 | 20.0 | — | — | — | — | — |
| SMAO-7 | — | — | — | — | — | 20.0 | 20.0 | 20.0 | 20.0 | — |
| SMAO-3 | — | — | — | — | — | — | — | — | — | 20.0 |
| TDA | 2.93 | 3.93 | 5.0 | 6.165 | 7.44 | 3.56 | 4.70 | 5.94 | 7.30 | 2.41 |
| TPO-L | 0.233 | 0.240 | 0.253 | 0.264 | 0.277 | 0.233 | 0.249 | 0.262 | 0.276 | 0.226 |
| A174 | 0.023 | 0.024 | 0.025 | 0.026 | 0.027 | 0.023 | 0.024 | 0.026 | 0.027 | 0.022 |

TABLE 6

Adhesive Compositions of Examples 20 to 25 (values are in grams).

| Material | Ex. 20 | Ex. 21 | Ex. 22 | Ex. 23 | Ex. 24 | Ex. 25 |
|---|---|---|---|---|---|---|
| SMAO-5 | 22.225 | — | — | — | — | — |
| SMAO-12 | — | 22.225 | — | — | — | — |
| SMAO-13 | — | — | 22.225 | — | — | — |
| SMAO-17 | — | — | — | 22.225 | — | — |
| SMAO-14 | — | — | — | — | 22.225 | — |
| SMAO-15 | — | — | — | — | — | 22.225 |
| TDA | — | — | 1.0 | — | — | — |
| IOA | 0.063 | — | — | — | — | — |
| 4-HBA | — | — | — | — | — | — |
| PPA6 | — | 7.8 | — | — | 10.49 | 6.3 |
| 2-EHA | — | — | — | 1.0 | — | — |
| 2-EEEA | 2.942 | — | — | — | — | — |
| TPO-L | 0.250 | 0.251 | 0.234 | 0.251 | 0.251 | 0.250 |
| A174 | 0.028 | 0.028 | 0.028 | 0.028 | 0.028 | 0.028 |

TABLE 7

Adhesive Compositions of Examples 26-31 (values are in grams).

| Material | Ex. 26 | Ex. 27 | Ex. 28 | Ex. 29 | Ex. 30 | Ex. 31 |
|---|---|---|---|---|---|---|
| SMAO-4 | 59.02 | 59.02 | — | — | — | — |
| SMAO-8 | — | — | 59.02 | 59.02 | — | — |
| SMAO-2 | — | — | — | — | 47.2 | 32.2 |
| IBOA | — | 8.0 | 16.0 | — | — | — |
| PPA6 | 2.74 | 2.74 | 2.74 | 2.74 | — | — |
| 4-HBA | — | — | — | — | — | — |
| TDA | 6.35 | — | — | 6.35 | — | 3.5 |
| KE311 | 13.62 | 12.0 | 24 | — | — | 7.4 |
| DOA | 9.08 | 9.08 | 9.08 | — | — | 5.0 |
| TPO-L | 1 | 1 | 1 | — | 0.8 | 0.5 |
| A174 | 0.5 | 0.5 | 0.5 | — | 0.4 | 0.3 |
| IRG 1076 | 0.9 | 0.9 | 0.9 | — | 0.8 | 0.5 |
| AO503 | 0.9 | 0.9 | 0.9 | — | 0.8 | 0.5 |

TABLE 8

Optical Properties, Shrinkage, Viscosity and Pluck Adhesion of Examples 1-3.

| | Ex. 1 | | | | Ex. 2 | | | | Ex. 3 | | | |
| | 65° C./90% RH | | 85° C. | | 65° C./90% RH | | 85° C. | | 65° C./90% RH | | 85° C. | |
| Time (h) | Initial | 170 | Initial | 1154 | Initial | 120 | Initial | 504 | Initial | 500 | Initial | 140 |
|---|---|---|---|---|---|---|---|---|---|---|---|---|
| L | 96.8 | 96.8 | 96.8 | 96.6 | 96.8 | 96.7 | 96.8 | 96.7 | — | 96.7 | — | 96.8 |
| a* | −0.1 | −0.07 | −0.06 | −0.08 | −0.06 | −0.05 | −0.07 | −0.07 | — | −0.06 | — | −0.06 |
| b* | 0.3 | 0.3 | 0.3 | 0.4 | 0.3 | 0.3 | 0.3 | 0.3 | — | 0.3 | — | 0.3 |
| % Haze | 0.1 | 0.1 | 0.1 | 0.1 | 0.1 | 0.5 | 0.1 | 0.1 | — | 0.1 | — | 0.0 |
| % T | 91.4 | 91.5 | 91.9 | 91.5 | 91.4 | 91.2 | 91.3 | 91.1 | — | 91.3 | — | 91.4 |
| Shrinkage (%) | — | | | | 2.43 | | | | — | | | |
| Viscosity (cps) | — | | | | 3,670 | | | | 4,150 | | | |
| Pluck Adhesion (N/cm²) | — | | | | 79.6 | | | | 54.3 | | | |

TABLE 9

Optical Properties, Shrinkage, Viscosity and Pluck Adhesion of Examples 4-6.

| | Ex. 4 | | | | Ex. 5 | | | | Ex. 6 | | | |
| | 65° C./90% RH | | 85° C. | | 65° C./90% RH | | 85° C. | | 65° C./90% RH | | 85° C. | |
| Time (h) | Initial | 1000 | Initial | 1154 | Initial | 170 | Initial | 170 | Initial | 120 | Initial | 504 |
|---|---|---|---|---|---|---|---|---|---|---|---|---|
| L | 96.8 | 96.6 | 96.8 | 96.6 | 96.8 | 96.8 | 96.8 | 96.8 | 96.8 | 96.6 | 96.8 | 96.8 |
| a* | −0.07 | −0.07 | −0.04 | −0.07 | −0.04 | −0.06 | −0.06 | −0.08 | −0.05 | −0.04 | −0.08 | −0.04 |
| b* | 0.3 | 0.3 | 0.3 | 0.3 | 0.2 | 0.3 | 0.2 | 0.35 | 0.3 | 0.3 | 0.3 | 0.35 |
| % Haze | 0.0 | 0.0 | 0.0 | 0.0 | 0.1 | 0.0 | 0.0 | 0.0 | 0.1 | 0.0 | 0.0 | 0.1 |
| % T | 91.3 | 90.8 | 91.4 | 90.9 | 91.5 | 91.5 | 91.5 | 91.4 | 91.4 | 91.0 | 91.4 | 91.3 |
| Shrinkage (%) | 2.40 | | | | — | | | | — | | | |
| Viscosity (cps) | 4,800 | | | | — | | | | — | | | |
| Pluck Adhesion (N/cm²) | 82.9 | | | | 39.3 | | | | 39.3 | | | |

TABLE 10

Optical Properties, Shrinkage, Viscosity and Pluck Adhesion of Examples 7-9.

| | Ex. 7 | | | | Ex. 8 | | | | Ex. 9 | | | |
|---|---|---|---|---|---|---|---|---|---|---|---|---|
| | 65° C./90% RH | | 85° C. | | 65° C./90% RH | | 85° C. | | 65° C./90% RH | | 85° C. | |
| Time (h) | Initial | 120 | Initial | 504 | Initial | 240 | Initial | 288 | Initial | 800 | Initial | 800 |
| L | 96.8 | 96.8 | 96.6 | 96.8 | 96.8 | 96.6 | 96.8 | 96.6 | 96.6 | 96.6 | 96.8 | 96.6 |
| a* | −0.05 | −0.05 | −0.07 | −0.06 | −0.07 | −0.04 | −0.05 | −0.05 | −0.04 | −0.09 | −0.05 | −0.11 |
| b* | 0.3 | 0.3 | 0.3 | 0.3 | 0.3 | 0.3 | 0.3 | 0.3 | 0.29 | 0.4 | 0.28 | 0.36 |
| % Haze | 0.1 | 0.1 | 0.1 | 0.1 | 0.1 | 0.1 | 0.0 | 0.0 | 0.1 | 0.6 | 0.1 | 0.2 |
| % T | 91.5 | 91.3 | 91.0 | 91.3 | 91.3 | 90.9 | 91.4 | 90.9 | 90.9 | 90.9 | 91.4 | 90.85 |
| Shrinkage (%) | | 2.45 | | | | 2.0 | | | | 2.18 | | |
| Viscosity (cps) | | 3,771 | | | | 3,893 | | | | 4,627 | | |
| Pluck Adhesion (N/cm²) | | 75.23 | | | | 104 | | | | 55.8 | | |

TABLE 11

Optical Properties, Shrinkage, Viscosity and Pluck Adhesion of Examples 10-12.

| | Ex. 10 | | | | Ex. 11 | | | | Ex. 12 | | | |
|---|---|---|---|---|---|---|---|---|---|---|---|---|
| | 65° C./90% RH | | 85° C. | | 65° C./90% RH | | 85° C. | | 65° C./90% RH | | 85° C. | |
| Time (h) | 0 | 432 | 0 | 432 | 0 | 432 | 0 | 432 | 0 | 432 | 0 | 432 |
| L | 96.7 | 96.7 | 96.6 | 96.7 | 96.7 | 96.6 | 96.6 | 96.7 | 96.7 | 96.7 | 96.8 | 96.6 |
| a* | −0.08 | −0.09 | −0.05 | −0.1 | −0.04 | −0.09 | −0.05 | −0.09 | −0.04 | −0.09 | −0.05 | −0.08 |
| b* | 0.29 | 0.23 | 0.26 | 0.28 | 0.26 | 0.27 | 0.25 | 0.26 | 0.28 | 0.26 | 0.26 | 0.26 |
| % Haze | 0.1 | 0.2 | 0.1 | 0.0 | 0.0 | 0.1 | 0.1 | 0.0 | 0.1 | 0.0 | 0.1 | 0.0 |
| % T | 91.2 | 91.1 | 91.1 | 91.0 | 91.1 | 90.7 | 91.0 | 91.0 | 91.0 | 91.1 | 91.4 | 90.8 |
| Shrinkage (%) | | — | | | | 2.23 | | | | — | | |
| Viscosity (cps) | | — | | | | 2,512 | | | | — | | |
| Pluck Adhesion (N/cm²) | | 48.3 | | | | 59.8 | | | | 57.8 | | |

TABLE 12

Optical Properties, Shrinkage, Viscosity and Pluck Adhesion of Examples 13-15.

| | Ex. 13 | | | | Ex. 14 | | | | Ex. 15 | | | |
|---|---|---|---|---|---|---|---|---|---|---|---|---|
| | 65° C./90% RH | | 85° C. | | 65° C./90% RH | | 85° C. | | 65° C./90% RH | | 85° C. | |
| Time (h) | 0 | 432 | 0 | 432 | 0 | 432 | 0 | 432 | 0 | — | 0 | — |
| L | 96.7 | 96.7 | 96.7 | 96.7 | 96.6 | 96.7 | 96.6 | 96.6 | 96.8 | — | 96.6 | — |
| a* | −0.05 | −0.08 | −0.04 | −0.08 | −0.04 | −0.08 | −0.05 | −0.1 | −0.06 | — | −0.05 | — |
| b* | 0.26 | 0.27 | 0.26 | 0.27 | 0.26 | 0.31 | 0.25 | 0.3 | 0.29 | — | 0.31 | — |
| % Haze | 0.0 | 0.1 | 0.0 | 0.1 | 0.0 | 0.6 | 0.1 | 0.0 | 0.1 | — | 0.1 | — |
| % T | 91.1 | 91.1 | 91.5 | 91.1 | 91.1 | 91.0 | 91.1 | 90.8 | 91.3 | — | 91.0 | — |
| Shrinkage (%) | | — | | | | — | | | | 1.98 | | |
| Viscosity (cps) | | — | | | | — | | | | 3,567 | | |
| Pluck Adhesion (N/cm²) | | 47.7 | | | | 51.9 | | | | 69.8 | | |

TABLE 13

Optical Properties, Shrinkage, Viscosity and Pluck Adhesion of Examples 16-19.

| | Ex. 16 | | | | Ex. 17 | | | | Ex. 18 | | | | Ex. 19 | | | |
|---|---|---|---|---|---|---|---|---|---|---|---|---|---|---|---|---|
| | 65° C./90% RH | | 85° C. | | 65° C./90% RH | | 85° C. | | 65° C./90% RH | | 85° C. | | 65° C./90% RH | | 85° C. | |
| Time (h) | 0 | 216 | 0 | 216 | 0 | 216 | 0 | 216 | 0 | 216 | 0 | 216 | 0 | — | 0 | — |
| L | 96.7 | 96.7 | 96.7 | 96.7 | 96.6 | 96.6 | 96.6 | 96.7 | 96.6 | 96.6 | 96.6 | 96.7 | 96.7 | — | 96.7 | — |
| a* | −0.08 | −0.11 | −0.05 | −0.11 | −0.07 | −0.09 | −0.06 | −0.10 | −0.07 | −0.09 | −0.06 | −0.12 | −0.06 | — | −0.06 | — |
| b* | 0.3 | 0.31 | 0.32 | 0.33 | 0.3 | 0.29 | 0.3 | 0.34 | 0.35 | 0.34 | 0.33 | 0.32 | 0.26 | — | 0.28 | — |
| % Haze | 0.0 | 0.0 | 0.0 | 0.0 | 0.1 | 0.1 | 0.1 | 0.0 | 0.1 | 0.5 | 0.3 | 0.3 | 0.1 | — | 0.1 | — |
| % T | 91.3 | 91.0 | 91.3 | 91.0 | 91.0 | 90.8 | 91.8 | 91.1 | 91.1 | 90.9 | 91.0 | 91.0 | 91.3 | — | 91.2 | — |

TABLE 13-continued

Optical Properties, Shrinkage, Viscosity and Pluck Adhesion of Examples 16-19.

| | Ex. 16 | | | | Ex. 17 | | | | Ex. 18 | | | | Ex. 19 | | | |
|---|---|---|---|---|---|---|---|---|---|---|---|---|---|---|---|---|
| | 65° C./90% RH | | 85° C. | | 65° C./90% RH | | 85° C. | | 65° C./90% RH | | 85° C. | | 65° C./90% RH | | 85° C. | |
| Time (h) | 0 | 216 | 0 | 216 | 0 | 216 | 0 | 216 | 0 | 216 | 0 | 216 | 0 | — | 0 | — |
| Shrinkage (%) | — | | | | — | | | | — | | | | 1.62 | | | |
| Viscosity (cps) | — | | | | — | | | | — | | | | 3,708 | | | |
| Pluck Adhesion (N/cm²) | — | | | | — | | | | — | | | | 57.4 | | | |

TABLE 14

Optical Properties, Shrinkage, Viscosity and Pluck Adhesion of Examples 20-22.

| | Ex. 20 | | | | Ex. 21 | | | | Ex. 22 | | | |
|---|---|---|---|---|---|---|---|---|---|---|---|---|
| | 65° C./90% RH | | 85° C. | | 65° C./90% RH | | 85° C. | | 65° C./90% RH | | 85° C. | |
| Time (h) | 0 | 140 | 0 | 140 | 0 | 648 | 0 | 648 | 0 | 240 | 0 | 240 |
| L | 96.8 | 96.8 | — | — | 96.8 | 96.6 | — | — | 97.0 | — | 97.0 | — |
| a* | −0.06 | −0.05 | — | — | −0.06 | −0.07 | — | — | −0.06 | — | −0.06 | — |
| b* | 0.2 | 0.3 | — | — | 0.3 | 0.4 | — | — | 0.3 | — | 0.3 | — |
| % Haze | 0.0 | 0.0 | — | — | 0.2 | 0.4 | — | — | 0.1 | ** | 0.1 | — |
| % T | 91.5 | 91.5 | — | — | 91.4 | 91.0 | — | — | 91.8 | — | 91.8 | — |
| Shrinkage (%) | — | | | | 2.8 | | | | 1.2 | | | |
| Viscosity (cps) | — | | | | 1,668 | | | | 27.84 | | | |
| Pluck Adhesion (N/cm²) | — | | | | 47.1 | | | | — | | | |

** Visually Hazy

TABLE 15

Optical Properties, Shrinkage, Viscosity and Pluck Adhesion of Examples 23-25.

| | Ex. 23 | | | | Ex. 24 | | | | Ex. 25 | | | |
|---|---|---|---|---|---|---|---|---|---|---|---|---|
| | 65° C./90% RH | | 85° C. | | 65° C./90% RH | | 85° C. | | 65° C./90% RH | | 85° C. | |
| Time (h) | 0 | 240 | 0 | 240 | 0 | 170 | 0 | 170 | 0 | 170 | 0 | 170 |
| L | 97.0 | — | 97.0 | — | 96.8 | — | 96.8 | — | 96.7 | — | 96.8 | — |
| a* | −0.07 | — | −0.07 | — | −0.05 | — | −0.04 | — | −0.07 | — | −0.07 | — |
| b* | 0.3 | — | 0.3 | — | 0.2 | — | 0.25 | — | 0.3 | — | 0.3 | — |
| % Haze | 0.1 | ** | 0.0 | — | 0.0 | ** | 0.0 | — | 0.3 | ** | 0.3 | — |
| % T | 91.8 | — | 91.8 | — | 91.5 | — | 91.5 | — | 91.3 | — | 91.3 | — |
| Shrinkage (%) | — | | | | — | | | | — | | | |
| Viscosity (cps) | — | | | | — | | | | — | | | |
| Pluck Adhesion (N/cm²) | — | | | | — | | | | — | | | |

** Visually Hazy

TABLE 16

Optical properties, Shrinkage, Viscosity and Pluck Adhesion of Examples 26-28.

| | Ex. 26 | | | | Ex. 27 | | | | Ex. 28 | | | |
|---|---|---|---|---|---|---|---|---|---|---|---|---|
| | 65° C./90% RH | | 85° C. | | 65° C./90% RH | | 85° C. | | 65° C./90% RH | | 85° C. | |
| Time (h) | 0 | 800 | 0 | 800 | 0 | 800 | 0 | 800 | 0 | 500 | 0 | 500 |
| L | 96.7 | 96.7 | 96.7 | 96.8 | 96.6 | 96.5 | 96.6 | 96.7 | 96.7 | 96.6 | 96.7 | 96.7 |
| a* | −0.1 | −0.1 | −0.1 | −0.1 | −0.1 | −0.1 | −0.1 | −0.1 | −0.1 | −0.1 | −0.1 | −0.1 |
| b* | 0.6 | 0.3 | 0.6 | 0.2 | 0.7 | 0.3 | 0.7 | 0.3 | 0.5 | 0.3 | 0.5 | 0.3 |
| % Haze | 0.1 | 0.4 | 0.1 | 0.4 | 0.2 | 0.7 | 0.2 | 0.3 | 0.1 | 0.2 | 0.1 | 0.4 |
| % T | 90.9 | 91.2 | 90.9 | 91.5 | 90.6 | 90.7 | 90.6 | 91.2 | 91.0 | 91.1 | 91.0 | 91.3 |
| Shrinkage (%) | 2.3 | | | | 2.5 | | | | 5.6 | | | |
| Viscosity (cps) | 3,100 | | | | 3,600 | | | | 4,800 | | | |
| Pluck Adhesion (N/cm²) | 32 | | | | 27 | | | | 36 | | | |

TABLE 17

Optical properties, Shrinkage, Viscosity and Pluck Adhesion of Examples 29-31.

| | Ex. 29 | | | | Ex. 30 | | | | Ex. 31 | | | |
|---|---|---|---|---|---|---|---|---|---|---|---|---|
| | 65° C./90% RH | | 85° C. | | 65° C./90% RH | | 85° C. | | 65° C./90% RH | | 85° C. | |
| Time (h) | 0 | 500 | 0 | 500 | 0 | 500 | 0 | 500 | 0 | 1000 | 0 | 1000 |
| L | 96.6 | 96.6 | 96.6 | 96.7 | — | — | — | — | — | — | — | — |
| a* | −0.1 | −0.1 | −0.1 | −0.1 | — | — | — | — | — | — | — | — |
| b* | 0.6 | 0.3 | 0.6 | 0.3 | — | — | — | — | — | — | — | — |
| % Haze | 0.1 | 0.2 | 0.1 | 0.5 | 0.8 | — | — | — | 0.44 | 0.76 | — | — |
| % T | 90.9 | 91.0 | 90.9 | 91.2 | 92.1 | — | — | — | 92.3 | 92.3 | — | — |
| Shrinkage (%) | 1.2 | | | | 1.50 | | | | 1.2 | | | |
| Viscosity (cps) | 4,700 | | | | 787,000 | | | | 88,400 | | | |
| Pluck Adhesion (N/cm$^2$) | 19 | | | | — | | | | — | | | |

TABLE 18

Optical properties of Examples 32-34.

| | Ex. 32 | | | | Ex. 33 | | | | Ex. 34 | | | |
|---|---|---|---|---|---|---|---|---|---|---|---|---|
| | 65° C./90% RH | | 85° C. | | 65° C./90% RH | | 85° C. | | 65° C./90% RH | | 85° C. | |
| Time (h) | 0 | 510 | 0 | 510 | 0 | 510 | 0 | 510 | 0 | 510 | 0 | 510 |
| L | 96.6 | 95.9 | 96.7 | 96.6 | 96.7 | 96.2 | 96.7 | 96.6 | 96.6 | 96.3 | 96.8 | 96.6 |
| a* | −0.04 | −0.08 | −0.03 | −0.1 | −0.03 | −0.07 | −0.6 | −0.05 | −0.04 | −0.1 | −0.04 | −0.09 |
| b* | 0.2 | 0.1 | 0.2 | 0.2 | 0.6 | 0.3 | 0.2 | 0.2 | 0.2 | 0.2 | 0.2 | 0.3 |
| % Haze | 0.0 | 24.7 | 0.0 | 0.0 | 0.1 | 8.7 | 0.0 | 0.0 | 0.0 | 7.2 | 0.0 | 0.1 |
| % T | 91.1 | 89.3 | 91.5 | 91.0 | 91.4 | 89.8 | 91.4 | 91.1 | 91.1 | 90.1 | 91.4 | 90.9 |

Preparation of a Thixotropic Adhesive Composition

Example 35

To the 5 L stainless steel reactor containing SMAO-18 described above (less the 1 kg sample removed for testing), 275 g TDA monomer, 50 g HBA monomer, 25 g TPO-L photoinitiator, 25 g IRG 1076, and 12.5 g A174 were added to the reaction vessel and mixed for 45 minutes, producing an adhesive composition. 100 g of this adhesive composition was placed in a white mixing container, (a Max 100 cup, from FlackTek Inc., Landrum, S.C.) and 4 g of VP NKC 130 were added. The components were mixed using a Hauschild SPEEDMIXER DAC 600 FV, from FlackTek Inc., operating at 2200 rpm for 4 minutes, producing Example 32. The viscosity at different shear rates and optical properties are shown in Table 1. The viscosity of the adhesive composition was 834 cps at a shear rate 1 sec$^{-1}$, without the addition of a thixotrope.

TABLE 19

Viscosity and Optical Properties of Example 32.

| Parameter | Measured Value |
|---|---|
| Viscosity at 0.01 s$^{-1}$ | 101,900 cps |
| Viscosity at 0.1 s$^{-1}$ | 34,100 cps |
| Viscosity at 1 s$^{-1}$ | 7,500 cps |
| Viscosity at 10 s$^{-1}$ | 2,600 cps |
| Viscosity at 100 s$^{-1}$ | 1,600 cps |
| L | 96.4 |
| a* | −0.2 |
| b* | 1.06 |
| % Haze | 0.93 |
| % Transmission | 89.2 |

This disclosure provides the following embodiments:

1. A curable composition comprising:
    a) a solute (meth)acryolyl oligomer having a $M_w$ of 5 to 30 k and a $T_g$ of <20° C. comprising
        i. greater than 50 parts by weight of (meth)acrylate ester monomer units,
        ii. 10 to 49 parts by weight of hydroxyl-functional monomer units,
        iii. 1 to 10 parts by weight of monomer units having pendent acrylate groups,
        iv. 0 to 20 parts by weight of polar monomer units,
        v. 0 to 10 parts by weight of silane-functional monomer units,
    wherein the sum of the monomer units is 100 parts by weight;
    b) a diluent monomer component, and
    c) a photoinitiator,
    wherein the composition comprises no crosslinking agents.

2. The adhesive composition of embodiment 1 comprising less than 50 wt. % of the diluent monomer component and greater than 50 wt. % of the solute oligomer.

3. The adhesive of any of the previous embodiments wherein the monomer units having pendent acrylate groups are prepared by reaction of said oligomer having pendent hydroxyl functional groups with an acryloyl compound having co-reactive functions groups.

4. The adhesive of embodiment 3 wherein the acryloyl compound having co-reactive functional groups is of the formula:

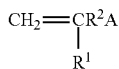

wherein $R^1$ is hydrogen, a $C_1$ to $C_4$ alkyl group, or a phenyl group, $R^2$ is a single bond or a (hetero)hydrocarbyl divalent linking group that joins an ethylenically unsaturated group to co-reactive functional group A, and A is a carboxyl, isocyanato, epoxy, anhydride, or oxazolinyl group.

5. The adhesive of any of the previous embodiments, wherein the alkanol of the (meth)acrylate ester monomer units of the oligomer have an average carbon number of $C_{10}$-$C_{14}$.

6. The adhesive of any of the previous embodiments, wherein the hydroxyl-functional monomer has the general formula:

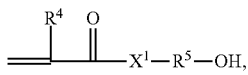

wherein
$R^5$ is a hydrocarbyl group;
$R^4$ is —H or $C_1$-$C_4$ alkyl; and
$X^1$ is —$NR^4$— or —O—.

7. The curable composition of any of the previous embodiments wherein the diluent monomer component comprises at least one monomer selected from acrylate ester monomer units, hydroxyl-functional monomer units; monomer units having pendent acrylate groups, polar monomer units, and silane-functional monomer units.

8. The curable composition of any of the previous embodiments wherein the diluent monomer component comprises:
80 to 100 parts by weight of (meth)acrylate ester monomers;
0 to 20 parts by weight of hydroxy-functional monomers;
0 to 5 parts by weight of polar monomers;
0 to 2 parts by weight of silane functional monomers, wherein the sum of the monomer of the diluent monomer component is 100 parts by weight.

9. The adhesive of any of the previous embodiments wherein the (meth)acrylic acid ester monomer component may comprise (meth)acrylate esters of 2-alkyl alkanols wherein the molar carbon number average of said 2-alkyl alkanols is 12 to 32.

10. The adhesive of any of the previous embodiments wherein the oligomer is of the formula:

where
-[$M^{Ester}$]- represents interpolymerized (meth)acrylate ester monomer units;
-[$M^{OH}$]- represents interpolymerized (meth)acryloyl monomer units having a pendent hydroxy group,
-[$M^{Polar}$]- represents interpolymerized polar monomer units; and
[$M^{Acryl}$] represents interpolymerized (meth)acryloyl monomer units having a pendent polymerizable (meth)acryloyl group;
[$M^{Silyl}$] represent optional silane-functional monomer subscripts a, b*, c, d and represent the parts by weight of each monomer unit.

11. The curable composition of any of the previous embodiments further comprising an additive selected from heat stabilizers, antioxidants, antistatic agents, thickeners, fillers, pigments, dyes, colorants, thixotropic agents, processing aides, nanoparticles, fibers and any combination thereof.

12. The curable composition of embodiment 11 wherein an additive is in amounts of 0.01 to 10 wt. % relative to the mass of curable composition.

13. The curable composition of any of the previous embodiments further comprising metal oxide particles having an average particle size of 1 nm to about 100 nm in amounts of 1 to 10 wt. %, relative to the total weight of the curable composition.

14. The curable composition of any of the previous embodiments wherein the hydroxyl-functional monomer is used in amounts such that the curable composition (oligomer+diluent) has a hydroxyl content greater than $6.5 \times 10^{-4}$ mol OH/g.

15. The curable composition of any of the previous embodiments wherein the oligomer is prepared by an adiabatic polymerization process.

16. An optically clear laminate comprising:
a first substrate having at least one major surface;
a second substrate having at least one major surface; and
the curable composition of any of the previous embodiments 1 to 15 situated between and in contact with at least one major surface of the first substrate and at least one major surface of the second substrate.

17. An optically clear laminate according to embodiment 16, wherein the first substrate, the second substrate, or both the first substrate and the second substrate are selected from a display panel, a touch panel, an optical film, a cover lens, or window.

18. An optically clear laminate according to embodiment 17, wherein the cover lens comprises at least one of glass, polymethylmethacrylate, or polycarbonate.

19. An optically clear laminate according to embodiment 17, wherein the display panel is selected from a liquid crystal display, a plasma display, an OLED display, an electrowetting display, and a cathode ray tube display.

20. An optically clear laminate according to embodiment 17, wherein the optical film is selected from a reflector, a polarizer, a mirror, an anti-glare or anti-reflective film, an anti-splinter film, a diffuser, or electromagnetic interference filter.

21. A laminate according to any of the previous embodiments 16 to 20, wherein the curable composition has a thickness of greater than about 100 μm.

22. A laminate according to embodiment 16, wherein at least one of the substrates is polycarbonate or poly(methyl)methacrylate.

23. An optically clear laminate comprising:
a first substrate having at least one major surface;
a second substrate having at least one major surface; and
an optically clear adhesive composition of any of the previous embodiments 1 to 15 situated between and in contact with at least one major surface of the first substrate and at least one major surface of the second substrate, wherein the adhesive has a moisture-vapor transmission rate of at least 400 g/m²/day.

24. A method of preparing an adhesive comprising the steps of:
(i) providing an essentially curable composition of any of the previous embodiments 1 to 15,
(ii) partially polymerizing said composition to provide a partially polymerized mixture exhibiting a Brookfield viscosity of between 1,000 and 500,000 mPas at 20° C. and a degree of conversion of monomers to polymer of between 85-99 wt. %, with respect to the mass of the monomers prior to polymerization, (iii) converting a portion of the hydroxyl functional monomer units of said oligomer to pendent polymerizable (meth) acrylate groups, (iv) adding one or more photoinitiators and solvent diluent monomers to the partially polymerized mixture to provide a radiation-curable composition, (iv) subsequently coating the radiation-curable composition on a substrate, and (v) further polymerizing the radiation-curable composition by subjecting it to actinic irradiation to provide said adhesive.

25. The method of embodiment 24 wherein the radiation curable composition is coated by knife-coating, gravure coating, curtain coating, air knife coating spray coating, die coating, draw bar coating or curtain coating or roll-coating.

26. The method of embodiment 24 wherein the radiation curable composition is coated by applying dots and/or lines via a needle, needle die or slot die to the substrate.

27. The method of embodiment 24 further comprising a tackifier.

28. The method of embodiment 24 further comprising a plasticizer.

What is claimed is:

1. A curable composition comprising:
a) a solute (meth)acryloyl oligomer having a $M_w$ of 5,000 to 30,000 and a $T_g$ of <20° C. comprising
   i. greater than 50 parts by weight of (meth)acrylate ester monomer units,
   ii. 10 to 49 parts by weight of hydroxyl-functional monomer units,
   iii. 1 to 10 parts by weight of monomer units having pendent acrylate groups,
   iv. 0 to 20 parts by weight of polar monomer units,
   v. 0 to 10 parts by weight of silane-functional monomer units,
   wherein the sum of the monomer units is 100 parts by weight;
b) a diluent monomer component, and
c) a photoinitiator,
d) a thixotropic agent in amounts of 0.01 and 10 wt. % with respect to the total weight of curable composition;
wherein the composition comprises no polyethylenically unsaturated monomer or other crosslinking agents.

2. The curable composition of claim 1 comprising less than 50 wt. % of the diluent monomer component and greater than 50 wt. % of the solute oligomer, relative to the total weight of the curable composition.

3. The curable composition of claim 1 wherein the monomer units having pendent acrylate groups are prepared by reaction of said oligomer having hydroxyl functional monomer units with an acryloyl compound having co-reactive functions groups.

4. The curable composition of claim 3 wherein the acryloyl compound having co-reactive functional groups is of the formula:

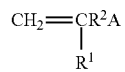

wherein $R^1$ is hydrogen, a $C_1$ to $C_4$ alkyl group, or a phenyl group; $R^2$ is a single bond or a (hetero)hydrocarbyl divalent linking group that joins an ethylenically unsaturated group to co-reactive functional group A, and A is a carboxyl, isocyanato, epoxy, anhydride, or oxazolinyl group.

5. The curable composition of claim 1, wherein the alkanol of the (meth)acrylate ester monomer units of the oligomer have an average carbon number of $C_{10}$-$C_{14}$.

6. The curable composition of claim 1, wherein the hydroxyl functional monomer has the general formula:

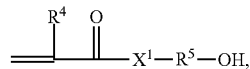

wherein
$R^5$ is a hydrocarbyl group;
$R^4$ is —H or $C_1$-$C_4$ alkyl; and
$X^1$ is —$NR^4$— or —O—.

7. The curable composition of claim 1 wherein the diluent monomer component comprises at least one monomer selected from acrylate ester monomer units, hydroxyl-functional monomer units; monomer units having pendent acrylate groups, polar monomer units, and silane-functional monomer units.

8. The curable composition of claim 1 wherein the diluent monomer component comprises:
80 to 100 parts by weight of (meth)acrylate ester monomers;
0 to 20 parts by weight of hydroxy-functional monomers;
0 to 5 parts by weight of polar monomers;
0 to 2 parts by weight of silane functional monomers,
wherein the sum of the monomer of the diluent monomer component is 100 parts by weight.

9. The curable composition of claim 1 wherein the (meth)acrylic acid ester monomer component comprises (meth)acrylate esters of 2-alkyl alkanols wherein the molar carbon number average of said 2-alkyl alkanols is 12 to 32.

10. The curable composition of claim 1 wherein the oligomer is of the formula:

-[$M^{Ester}$])- represents interpolymerized (meth)acrylate ester monomer units;
-[$M^{OH}$]- represents interpolymerized (meth)acryloyl monomer units having a pendent hydroxy group,
-[$M^{Polar}$] represent optional polar monomer units, and
[$M^{Acryl}$] represents interpolymerized (meth)acryloyl monomer units having a pendent polymerizable (meth)acryloyl group;
[$M^{Silyl}$] represent optional silane-functional monomer subscripts a, b*, c, d and represent the parts by weight of each monomer unit.

11. The curable composition of claim 1 further comprising an additive selected from heat stabilizers, antioxidants, antistatic agents, thickeners, fillers, pigments, dyes, colorants, processing aides, nanoparticles, fibers and any combination thereof.

12. The curable composition of claim 11 wherein an additive is in amounts of 0.01 to 10 wt. % relative to the total weight of curable composition.

13. The curable composition of claim 1 further comprising metal oxide particles having an average particle size of 1 nm to about 100 nm in amounts of 1 to 10 wt. %, relative to the total weight of the curable composition.

14. The curable composition of claim 1 wherein the hydroxyl-functional monomer is used in amounts such that the curable composition has a hydroxyl content greater than $6.5 \times 10^{-4}$ mol OH/g.

15. The curable composition of claim 1 wherein the oligomer is prepared by an adiabatic polymerization process.

16. An optically clear laminate comprising:
a first substrate having at least one major surface;
a second substrate having at least one major surface; and
the curable composition of claim 1 situated between and in contact with at least one major surface of the first substrate and at least one major surface of the second substrate.

17. An optically clear laminate according to claim 16, wherein the first substrate, the second substrate, or both the first substrate and the second substrate are selected from a display panel, a touch panel, an optical film, a cover lens, or window.

18. An optically clear laminate according to claim 17, wherein the cover lens comprises at least one of glass, polymethylmethacrylate, or polycarbonate.

19. An optically clear laminate according to claim 17, wherein the display panel is selected from a liquid crystal display, a plasma display, an OLED display, an electrowetting display, and a cathode ray tube display.

20. An optically clear laminate according to claim 17, wherein the optical film is selected from a reflector, a polarizer, a mirror, an anti-glare or anti-reflective film, an anti-splinter film, a diffuser, or electromagnetic interference filter.

21. A laminate according to claim 16, wherein the curable composition has a thickness of greater than about 100 μm.

22. A laminate according to claim 16, wherein at least one of the substrates is polycarbonate or poly(methyl)methacrylate.

23. An optically clear laminate comprising:
a first substrate having at least one major surface;
a second substrate having at least one major surface; and
an optically clear adhesive composition of claim 1 situated between and in contact with at least one major surface of the first substrate and at least one major surface of the second substrate, wherein the adhesive has a moisture-vapor transmission rate of at least 400 g/m²/day.

24. A method of preparing an adhesive comprising the steps of:
(i) providing an essentially curable composition of claim 1,
(ii) partially polymerizing said composition to provide a partially polymerized mixture exhibiting a Brookfield viscosity of between 1,000 and 500,000 mPas at 20° C. and a degree of conversion of monomers to polymer of between 85-99 wt. %, with respect to the total weight of the monomers prior to polymerization,
(iii) converting a portion of the hydroxyl functional monomer units of said oligomer to pendent polymerizable (meth)acrylate groups,
(iv) adding one or more photoinitiators and solvent diluent monomers to the partially polymerized mixture to provide a radiation-curable composition,
(iv) subsequently coating the radiation-curable composition on a substrate, and
(v) further polymerizing the radiation-curable composition by subjecting it to actinic irradiation to provide said adhesive.

25. The method of claim 24 wherein the radiation curable composition is coated by knife-coating, gravure coating, curtain coating, air knife coating spray coating, die coating, draw bar coating or curtain coating or roll-coating.

26. The method of claim 24 wherein the radiation curable composition is coated by applying dots and/or lines via a needle, needle die or slot die to the substrate.

27. The method of claim 24 further comprising a tackifier.

28. The method of claim 24 further comprising a plasticizer.

29. The curable composition of claim 1 wherein the thixotropic agent is fumed silica in amounts of 2 to about 10 wt. %, relative to the total weight of the curable composition.

30. The curable composition of claim 29 wherein the thixotropic agent is hydrophobic fumed silica.

* * * * *